(12) United States Patent
Lauer et al.

(10) Patent No.: US 9,577,857 B2
(45) Date of Patent: Feb. 21, 2017

(54) ADAPTIVE MODULATION IN A HYBRID VEHICLE COMMUNICATION SYSTEM

(71) Applicant: GOGO LLC, Itasca, IL (US)

(72) Inventors: Bryan Adrian Lauer, Hinckley, IL (US); Rukmani Loganathan, Bartlett, IL (US); Sajit Sasi, Chicago, IL (US); Pat Walsh, Naperville, IL (US); Anand Chari, Naperville, IL (US)

(73) Assignee: GOGO LLC, Chicago, IL (US)

( * ) Notice: Subject to any disclaimer, the term of this patent is extended or adjusted under 35 U.S.C. 154(b) by 311 days.

(21) Appl. No.: 14/224,859

(22) Filed: Mar. 25, 2014

(65) Prior Publication Data

US 2015/0131512 A1    May 14, 2015

Related U.S. Application Data

(60) Provisional application No. 61/901,634, filed on Nov. 8, 2013, provisional application No. 61/901,641, filed
(Continued)

(51) Int. Cl.
*H04L 27/08* (2006.01)
*H04L 27/00* (2006.01)
(Continued)

(52) U.S. Cl.
CPC ....... *H04L 27/0008* (2013.01); *H04B 7/18506* (2013.01); *H04L 5/1453* (2013.01);
(Continued)

(58) Field of Classification Search
None
See application file for complete search history.

(56) References Cited

U.S. PATENT DOCUMENTS

| 5,546,397 A | 8/1996 | Mahany |
| 5,557,656 A | 9/1996 | Ray et al. |

(Continued)

FOREIGN PATENT DOCUMENTS

| EP | 0902551 A2 | 3/1999 |
| EP | 1976152 A1 | 10/2008 |

(Continued)

OTHER PUBLICATIONS

"Aero Mobile Terminals: Models 2540/2532" Product Sheet, ViaSat, 2 pp. (2012).
(Continued)

*Primary Examiner* — Christopher Crutchfield
*Assistant Examiner* — Tito Pham
(74) *Attorney, Agent, or Firm* — Marshall, Gerstein & Borun LLP; Randall G. Rueth

(57) ABSTRACT

Techniques for providing hybrid communications to devices on vehicles include using a selected modulation scheme on a forward link to deliver data (that is intended to be received by an on-board device) onto a vehicle, and using a reverse link in a different frequency band to send reverse data from the vehicle. Based on the reverse data, a subsequent predefined modulation scheme for a subsequent forward transmission is selected from a plurality of modulation schemes corresponding to a plurality of performance levels of data delivery. The selections may be based on a current geospatial location of the vehicle, a type of data, and/or on one or more other dynamic conditions. The forward data may be multiplexed and/or multicast. Thus, adaptive modulation is achieved in a hybrid communications system in which the forward link and the reverse link to the vehicle are supported by different wireless communication bands.

20 Claims, 5 Drawing Sheets

Related U.S. Application Data on Nov. 8, 2013, provisional application No. 61/901,644, filed on Nov. 8, 2013.

(51) Int. Cl.

| | | |
|---|---|---|
| *H04L 5/14* | (2006.01) | |
| *H04W 72/00* | (2009.01) | |
| *H04W 72/04* | (2009.01) | |
| *H04B 7/185* | (2006.01) | |
| *H04L 29/08* | (2006.01) | |

(52) U.S. Cl.
CPC .......... *H04L 67/12* (2013.01); *H04W 72/005* (2013.01); *H04W 72/0453* (2013.01)

(56) References Cited

U.S. PATENT DOCUMENTS

| | | |
|---|---|---|
| 5,652,795 A | 7/1997 | Dillon et al. |
| 5,699,384 A | 12/1997 | Dillon |
| 5,722,074 A | 2/1998 | Muszynski |
| 5,740,366 A | 4/1998 | Mahany et al. |
| 5,844,893 A | 12/1998 | Gollnick et al. |
| 5,940,771 A | 8/1999 | Gollnick et al. |
| 5,995,725 A | 11/1999 | Dillon |
| 5,995,726 A | 11/1999 | Dillon |
| 6,009,328 A | 12/1999 | Muszynski |
| 6,016,388 A | 1/2000 | Dillon |
| 6,125,184 A | 9/2000 | Dillon et al. |
| 6,131,160 A | 10/2000 | Dillon et al. |
| 6,161,141 A | 12/2000 | Dillon |
| 6,310,582 B1 | 10/2001 | Uetake et al. |
| 6,374,311 B1 | 4/2002 | Mahany et al. |
| 6,665,536 B1 | 12/2003 | Mahany |
| 6,697,415 B1 | 2/2004 | Mahany |
| 6,714,559 B1 | 3/2004 | Meier |
| 6,788,935 B1 | 9/2004 | McKenna et al. |
| 6,810,527 B1 | 10/2004 | Conrad et al. |
| 7,013,138 B2 | 3/2006 | Mahany |
| 7,062,268 B2 | 6/2006 | McKenna |
| 7,107,062 B2 | 9/2006 | Cruz et al. |
| 7,386,002 B2 | 6/2008 | Meier |
| 7,457,646 B2 | 11/2008 | Mahany et al. |
| 7,483,696 B1 | 1/2009 | Mitchell |
| 7,535,921 B2 | 5/2009 | Meier |
| 7,536,167 B2 | 5/2009 | Gollnick et al. |
| 7,548,553 B2 | 6/2009 | Meier |
| 7,558,569 B2 | 7/2009 | Chang et al. |
| 7,636,552 B2 | 12/2009 | Monk |
| 7,702,328 B2 | 4/2010 | Lemond et al. |
| 7,710,907 B2 | 5/2010 | Mahany |
| 7,715,853 B1 | 5/2010 | Frerking et al. |
| 7,751,814 B2 | 7/2010 | Cruz et al. |
| 7,873,343 B2 | 1/2011 | Gollnick et al. |
| 7,916,747 B2 | 3/2011 | Meier |
| RE42,536 E | 7/2011 | Leuca et al. |
| 8,068,829 B2 | 11/2011 | Lemond et al. |
| 8,078,163 B2 | 12/2011 | Lemond et al. |
| 8,094,605 B2 | 1/2012 | Lynch et al. |
| 8,169,946 B2 | 5/2012 | Lynch et al. |
| 8,280,309 B2 | 10/2012 | Monk |
| 8,358,971 B2 | 1/2013 | Schiff |
| 8,452,276 B2 | 5/2013 | Lauer |
| 8,499,324 B1 | 7/2013 | Mitchell et al. |
| 2002/0160773 A1 | 10/2002 | Gresham et al. |
| 2002/0170060 A1 | 11/2002 | Lyman |
| 2003/0041155 A1 | 2/2003 | Nelson et al. |
| 2003/0214966 A1 | 11/2003 | Taylor |
| 2004/0097192 A1 | 5/2004 | Schiff |
| 2005/0053026 A1 | 3/2005 | Mullan et al. |
| 2005/0077424 A1 | 4/2005 | Schneider |
| 2005/0286452 A1 | 12/2005 | Hardgrave et al. |
| 2006/0030311 A1 | 2/2006 | Cruz et al. |
| 2006/0229070 A1 | 10/2006 | de La Chapelle et al. |
| 2006/0281404 A1 | 12/2006 | Lee et al. |
| 2007/0021117 A1 | 1/2007 | McKenna et al. |
| 2007/0042772 A1 | 2/2007 | Salkini et al. |
| 2008/0004016 A1 | 1/2008 | Smee et al. |
| 2008/0115007 A1 | 5/2008 | Jalali |
| 2008/0141314 A1 | 6/2008 | Lemond et al. |
| 2008/0182573 A1 | 7/2008 | Lauer et al. |
| 2008/0240029 A1 | 10/2008 | Lynch et al. |
| 2008/0274734 A1 | 11/2008 | Kostanic et al. |
| 2009/0070841 A1* | 3/2009 | Buga ................ H04B 7/18506 725/116 |
| 2009/0086611 A1 | 4/2009 | Isshiki et al. |
| 2009/0096857 A1 | 4/2009 | Frisco et al. |
| 2009/0279490 A1 | 11/2009 | Alcorn |
| 2010/0098034 A1 | 4/2010 | Tang et al. |
| 2011/0122811 A1 | 5/2011 | Yuan et al. |
| 2011/0223926 A1 | 9/2011 | Nakao et al. |
| 2011/0265128 A1 | 10/2011 | Bengeult et al. |
| 2011/0314488 A1 | 12/2011 | Keen et al. |
| 2013/0195106 A1 | 8/2013 | Calmon et al. |
| 2013/0203398 A1* | 8/2013 | Callard ................ H04W 88/08 455/418 |
| 2014/0105149 A1* | 4/2014 | Lindoff ................ H04L 1/0003 370/329 |
| 2014/0156844 A1 | 6/2014 | Cavgalar |
| 2014/0282684 A1 | 9/2014 | Keen et al. |
| 2014/0282727 A1 | 9/2014 | Keen et al. |
| 2015/0131512 A1* | 5/2015 | Lauer ................ H04L 27/0008 370/312 |
| 2015/0131513 A1 | 5/2015 | Lauer et al. |
| 2015/0131519 A1 | 5/2015 | Kanabar et al. |
| 2015/0171939 A1* | 6/2015 | Davydov .............. H04W 28/24 370/329 |
| 2015/0318913 A1 | 11/2015 | Lauer et al. |

FOREIGN PATENT DOCUMENTS

| | | |
|---|---|---|
| EP | 2568533 A1 | 3/2013 |
| WO | WO-99/31821 A1 | 6/1999 |

OTHER PUBLICATIONS

"Direcway™ DW3000/DW4000 Series Systems: Satisfying the Need for Speed for the Multimedia Internet," Hughes Network Systems, 2 pp. (Jun. 2001).

"Exede® Internet: Fastest In-Flight Wi-Fi Unleash the Internet," ViaSat, 4 pp. (2012).

"Gogo Partners with AeroSat to Bring Ku-Satellite Service to Market," Gogo LLC, 2 pp. (May 18, 2012).

"Hughes and ThinKom Demonstrate New Tactical Communications Solutions," press release, Hughes Network Systems, LLC, 2 pp. (Oct. 25, 2012).

"Hughes HX200 Broadband Satellite Router," Hughes Network Systems, LLC, 2 pp. (2012).

ETSI Technical Specification 102 441 (v1.1.1), "Digital Video Broadcasting (DVB); DVB-S2 Adaptive Coding and Modulation for Broadband Hybrid Satellite Dialup Applications", European Telecommunications Standards Institute (ETSI), European Broadcasting Union, 23 pp. (2005).

European Standard 301 195 (v1.1.1), "Digital Video Broadcasting (DVB); Interaction channel through the Global System for Mobile communications (GSM)," European Telecommunications Standards Institute (ETSI), 14 pp. (Feb. 1999).

European Telecommunication Standard (ETS 300 801), "Digital Video Broadcasting (DVB); Interaction channel through Public Switched Telecommunications Network (PSTN) / Integrated Services Digital Networks (ISDN)," European Telecommunications Standards Institute (ETSI), 14 pp. (Aug. 1997).

International Search Report and Written Opinion for Application No. PCT/US2014/064826 dated Aug. 6, 2015.

Second Written Opinion, corresponding International Application No. PCT/US2014/064797, mailing date Sep. 24, 2015.

International Search Report and Written Opinion, International Application No. PCT/US2014/064797, mailed Feb. 23, 2015.

* cited by examiner

ADAPTIVE MODULATION IN A HYBRID VEHICLE COMMUNICATION SYSTEM

CROSS-REFERENCE TO RELATED APPLICATIONS

The present application claims priority to and the benefit of the filing date of U.S. Provisional Patent Application No. 61/901,644 entitled "DATA DELIVERY TO DEVICES ON VEHICLES USING MULTIPLE FORWARD LINKS" filed Nov. 8, 2013, the entire contents of which are hereby incorporated by reference herein. Further, the present application claims priority to and the benefit of the filing date of U.S. Provisional Patent Application No. 61/901,641 entitled "OPTIMIZING USAGE OF MODEMS FOR DATA DELIVERY TO DEVICES ON VEHICLES" filed Nov. 8, 2013, the entire contents of which are hereby incorporated by reference herein; and claims priority to and the benefit of the filing date of U.S. Provisional Patent Application No. 61/901,634 entitled "HYBRID COMMUNICATIONS FOR DEVICES ON VEHICLES" filed Nov. 8, 2013, the entire contents of which are hereby incorporated by reference herein.

Additionally, the present application is related to co-pending U.S. patent application Ser. No. 13/675,200 entitled "VEHICLE DATA DISTRIBUTION SYSTEM AND METHOD" and filed on Nov. 13, 2012; co-pending U.S. patent application Ser. No. 13/675,194 entitled "COMMUNICATIONS SYSTEM AND METHOD FOR NODES ASSOCIATED WITH A VEHICLE" and filed on Nov. 13, 2012; and co-pending U.S. patent application Ser. No. 13/675,190 entitled "GROUND SYSTEM FOR VEHICLE DATA DISTRIBUTION" and filed on Nov. 13, 2012. The contents of these related applications are hereby incorporated by reference in their entireties.

FIELD AND BACKGROUND OF THE DISCLOSURE

Technical Field

The instant disclosure generally relates to providing adaptive modulation in a system that delivers communications to and from devices that are on-board vehicles using a forward link and a reverse link in different frequency bands.

Background

Some existing airlines and other transportation companies provide services, such as Wi-Fi or other data delivery services, to a device that is on-board a vehicle while the vehicle is traveling en route to a destination. The on-board device may be, for example, a device that is fixedly connected to the vehicle (e.g., a device that is included in a Line Replaceable Unit (LRU) on an aircraft), or the on-board device may be a mobile computing device such as a smart phone, tablet or laptop computing device that is temporarily being transported by the vehicle. To establish communications for services to such on-board devices, providers often utilize a wireless communication link such as a direct Air-to-Ground (ATG) link or a satellite link over which communications or data is delivered to and from the vehicle. The wireless communication link is typically a bi-directional communication link supported by a particular frequency band. All forward data (i.e., data delivered to the vehicle) and all reverse data (i.e., data sent from the vehicle) is transmitted and received over this bi-directional link, and adaptive modulation may be performed on the bi-directional link to adjust modulation or coding techniques to respond to dynamic conditions that affect transmission performance.

BRIEF SUMMARY OF THE DISCLOSURE

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In an embodiment, a method of providing communications to and from devices being transported by vehicles may include obtaining, e.g., at a hybrid communications distributor disposed in a terrestrial location, first content that is to be delivered to a mobile computing device that is temporarily being transported by a vehicle. The method may also include selecting a first modulation scheme from a set of pre-defined modulation schemes, and causing a forward transmission including the first content to be sent via a forward link to the vehicle. The forward link may be included in a first communication link supported by a first frequency band, and the forward transmission may be configured using the first modulation scheme and may include an indication of the device in addition to the first content, for example. The method may further include receiving, via a reverse link included in a second communication link supported by a second frequency band, feedback information, e.g., feedback information corresponding to the forward transmission. Still further, the method may include selecting, based on the feedback information, a second modulation scheme from the set of pre-defined modulation schemes for delivery of a subsequent forward transmission to the vehicle, where the subsequent forward transmission includes second content that is to be delivered to the device or to another device being transported by the vehicle. The method may include causing the subsequent forward transmission to be sent via the forward link to the vehicle, and the subsequent forward transmission may be configured using the second modulation scheme.

In an embodiment, a hybrid communication system for communicating with devices that are being transported by vehicles includes a hybrid communications distributor that is communicatively connected to an in-flight vehicle via a forward link included in a first wireless communication link. The forward link may support a plurality of modulation schemes, each of which corresponds to a respective level of performance. The hybrid communications distributor may include one or more processors and one or more non-transitory, tangible, computer-readable storage media storing computer-executable instructions. The computer-executable instructions, when executed by the one or more processors of the hybrid communications distributor, may cause the hybrid communications distributor to obtain first content that is to be delivered to a device being transported by the in-flight vehicle, and determine one of the plurality of modulation schemes to be utilized for delivery of the first content. The instructions may further cause the hybrid communications distributor to cause a forward transmission to be sent to the in-flight vehicle over the forward link using the determined one of the plurality of modulation schemes, where the forward transmission includes the first content intended for the device and an indication of the device. Additionally, the instructions may cause the hybrid communications distributor to receive feedback information transmitted from the in-flight vehicle via a reverse link included in a second wireless communication link supported a frequency band different than the frequency band supporting the first wireless communication link, and determine, based on the feedback information, a subsequent one of the plurality of modulation schemes for delivery of a subsequent forward transmission to the in-flight vehicle, The subsequent forward transmission may include second content is to be delivered to the device or to another device being transported by the in-flight vehicle, for example. Further, the instructions may cause the hybrid communications distributor to cause the subsequent forward transmission to be sent over the forward link to the in-flight vehicle using the selected subsequent one of the plurality of modulation schemes.

An embodiment of a method of providing communications to and from devices being transported by in-flight vehicles includes receiving, via a forward link at a vehicle that is in-flight, a forward transmission in a first modulation scheme. The forward link may be included in a first wireless communication link supported by a first frequency band, for example, and the first modulation scheme may be included in a plurality of pre-defined modulation schemes that a modem (which is fixedly connected to the vehicle) is capable of supporting without any reconfiguration. In some cases, the forward transmission may be received at the modem. The method also includes demodulating the forward transmission and determining, by a hybrid communications collector fixedly connected to the vehicle, first content that is included in the demodulated forward transmission and that is intended to be delivered to a device, where the device is a mobile computing device that is temporarily being transported by the vehicle. The method may further include causing the first content to be sent to the device using a wireless network contained within the vehicle, and causing feedback information to be transmitted from the vehicle using a reverse link included in a second wireless communication link supported by a second frequency band. The feedback information may be based on a current geo-spatial position of the vehicle, for example. Additionally, the method includes receiving, at the vehicle, a subsequent forward transmission in a second modulation scheme included in the plurality of pre-defined modulation schemes (where the second modulation scheme selected based on the feedback information), demodulating the subsequent forward transmission; and causing the second content to be sent to the device or to the another device using the wireless network contained within the vehicle.

DETAILED DESCRIPTION OF THE PREFERRED EMBODIMENTS

Figure 1:
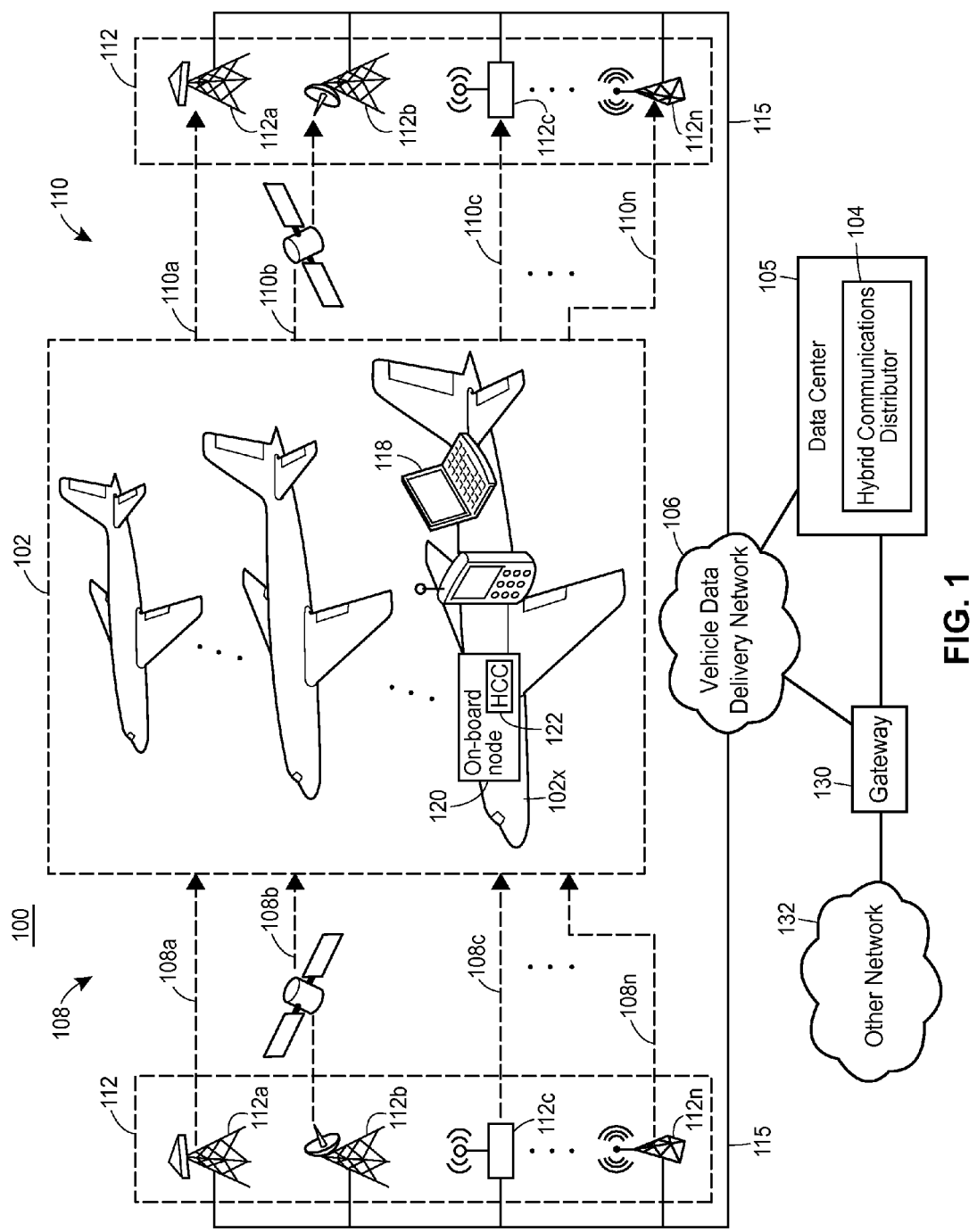
FIG. 1 illustrates an exemplary hybrid communications system for delivering data to and from devices that are on-board a set of vehicles.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Additionally, any or all of the contents of the present disclosure may operate in conjunction with any or all of the contents of the disclosure of co-pending U.S. patent application Ser. No. 13/675,200 entitled "VEHICLE DATA DISTRIBUTION SYSTEM AND METHOD," the contents of which are hereby incorporated by reference in their entirety. Further, any or all of the contents of the present disclosure may operate in conjunction with any or all of the contents of the disclosure of co-pending U.S. patent application Ser. No. 13/675,194 entitled "COMMUNICATIONS SYSTEM AND METHOD FOR NODES ASSOCIATED WITH A VEHICLE, the contents of which are hereby incorporated by reference in their entirety, and any or all of the contents of the present disclosure may operate in conjunction with any or all of the contents of the disclosure of co-pending U.S. patent application Ser. No. 13/675,190 entitled "GROUND SYSTEM FOR VEHICLE DATA DISTRIBUTION," the contents of which are hereby incorporated by reference in their entirety.

Still further, any or all of the contents of the present disclosure may operate in conjunction with any or all of the contents of the disclosures U.S. Provisional Patent Application No. 61/901,644 entitled "DATA DELIVERY TO DEVICES ON VEHICLES USING MULTIPLE FORWARD LINKS" filed Nov. 8, 2013; U.S. Provisional Patent Application No. 61/901,641 entitled "OPTIMIZING USAGE OF MODEMS FOR DATA DELIVERY TO DEVICES ON VEHICLES" filed Nov. 8, 2013; and/or U.S. Provisional Patent Application No. 61/901,634 entitled "HYBRID COMMUNICATIONS FOR DEVICES ON VEHICLES" filed Nov. 8, 2013, the contents of which are hereby incorporated by reference in their entireties.

FIG. 1 is a block diagram depicting an example hybrid communications system 100 for communicating information or data to and from devices that are being transported by the vehicles 102. The hybrid system 100 may be configured to deliver data or information to a specific device that is on-board one of the vehicles 102 (e.g., the device 118 on-board the vehicle 102x) in a hybrid manner, e.g., by using a forward link (e.g., a link to deliver data to the vehicle 102x) included in a first frequency band allocated for wireless communications, and a reverse link (e.g., a link to receive data from the vehicle 102x) included in a second frequency band allocated for wireless communications.

The data or information corresponding to the vehicles 102 may be sent to and received from a data center 105 or from a hybrid communications distributor 104 included in the data center 105. In some implementations, the hybrid communications system 100 is configured to deliver feedback information from the vehicle 102x to the data center 105 or the hybrid communications distributor 104, and the data center 105 or the hybrid communications distributor 104 may use the feedback information to inform subsequent data delivery to the on-board device 118 or to other on-board devices. In an embodiment, the hybrid communications distributor 104 and the data center 105 are communicatively connected to the vehicles 102 via one or more vehicle data delivery networks 106, one or more forward links 108, and one or more reverse links 110.

One or more of the vehicles 102 may be owned and/or operated by a specific individual. In some cases, one or more of the vehicles 102 may be owned and/or operated by a company, organization or government entity. For example, the vehicles 102 may include a fleet of vehicles that are used to transport passengers who pay for or otherwise are granted passage on one of the vehicles of the fleet. The vehicles 102 may include one or more vehicles that are used by an organization to transport employees and their guests, in some situations. One or more of the vehicles 102 may be used to transport live or inanimate cargo, packages, mail, and/or other types of cargo. It is noted that although FIG. 1 depicts the vehicles 102 as being airplanes, the techniques and principles described herein equally apply to other types of vehicles such as trucks, automobiles, busses, trains, boats, ships, barges, subway cars, helicopters or other types of aircraft, ambulances or other emergency vehicles, military vehicles, other air-borne, water-borne, or land-borne vehicles, and vehicles that are suitable for space travel.

Each of the vehicles 102 may be communicatively connected to the data center 105 via one or more forward wireless communication links 108 and one or more reverse wireless communication links 110. The links 108, 110 may be collectively supported by a multiplicity of radio frequency (RF) bands. Typically, a particular frequency band or portion of RF spectrum supporting the links 108, 110 is allocated (e.g., by a governmental or regulatory body) for a particular type of wireless communications such as satellite communications, ham-radio communications, terrestrial cellular communications, near-field wireless communications, optical or long-range wireless communications, and the like. In some allocated frequency bands, wireless communications may be transmitted over a forward link and a corresponding reverse link (both of which are supported by the same, allocated frequency band) using a respective wireless communication protocol that is defined, designated or otherwise indicated by a standards association and/or by a government or other regulatory body. A particular frequency band may support a point-to-point wireless protocol and/or may support a broadband wireless protocol, for example.

Each frequency band may include one or more channels. The channels may be formed, defined or allocated by frequency division, time division, code division, some other suitable channel division, or some combination of divisions. Signals that are carried on a channel may or may not be multiplexed. Any one or more channels included in a frequency band may support (or may be designated to support) a forward link and/or a reverse link for wireless communications. Additionally, any one or more of the channels included in a frequency band may be used to deliver signaling, data payload, or a combination of signaling and data payload. For example, a particular frequency band may support an in-band protocol in which signaling and payload are transmitted over a same channel within the band, and/or the particular frequency band may support an out-of-band protocol in which the signaling and payload are respectively transmitted over different channels within the band.

A transceiver or modem that is fixedly connected to a vehicle 102x may be tuned to a particular frequency band, and thus, along with a respective antenna, may serve as one end of a communication link over which data may be received onto and/or sent from the vehicle 102x. Similarly, a transceiver or modem that is fixedly connected to a structure 112 external to the vehicle 102x may also be tuned to the particular frequency band, and thus, along with a respective antenna, may serve as the other end of the communication link over which the data is received onto and/or sent from the vehicle 102x. The structure 112 that supports the non-vehicle end of the communication link may be, for example, an entirely stationary terrestrial structure such as a building or tower on the ground, a relatively stationary terrestrial structure such as a barge in an ocean, or a non-terrestrial structure such as a satellite or other structure in space. In FIG. 1, the representations of the structures 112 are duplicated to more clearly illustrate the forward links 108 and reverse links 110, however, in practice, each structure 112 may be a unitary structure having a single physical transceiver or modem mounted thereon that services both the respective forward link 108 and the respective reverse link 110. For example, a teleport 112b may include a transceiver that services both the satellite forward link 108b and the satellite reverse link 110b of a particular frequency band allocated for satellite communications. In some instances, a single structure 112 may include multiple transceivers or modems, each of which may be tuned to a different frequency band.

With further regard to the structures 112, in addition to having a transceiver or modem supporting one end of a particular communication link 108, 110 to the vehicle 102x, each structure 112 may include another interface via which a communication path 115 to the hybrid communications distributor 104 at the data center 105 may be communicatively connected. The interface to the communication path 115 may be a wired or a wireless communications interface.

A vehicle 102x may include one or more fixedly connected modems or transceivers to support one or more communication links 108, 110 over one or more frequency bands, and the vehicle 102x may utilize these modems or transceivers to receive data onto the vehicle 102x and/or to transmit data from the vehicle 102x. For example, a vehicle 102x may include thereon a transceiver or modem tuned to a frequency band that is allocated for direct communications between vehicles 102 and ground stations, or on which a direct air-to-ground (ATG) communication link is supported (e.g., 849-851 MHz and 894-896 MHz). Such an ATG communication link is denoted in FIG. 1 by the forward link 108a and the reverse link 110a that are terrestrially supported by one or more structures 112a. A vehicle 102x may additionally or alternatively include thereon a transceiver or modem tuned to a frequency band that is allocated for satellite communications (denoted in FIG. 1 by the forward link 108b and the reverse link 110b that are terrestrially supported by one or more structures 112b), such the L band (e.g., 40 to 60 GHz or 1 to 2 GHz), the $K_u$ band (e.g., 12-18 GHz), the $K_a$ band (e.g., 26.5-40 GHz), and/or other spectrum that is allocated for satellite communications.

Other examples of communication links that may be established with the vehicle 102x include terrestrial mobile or cellular communication links (denoted in FIG. 1 by the references 108c/110c/112c), e.g., communication links that support TDMA (Time Division Multiple Access), GSM (Global System for Mobile Communications), CDMA (Code Division Multiple Access), Wi-MAX (Worldwide Interoperability for Microwave Access), LTE (Long Term Evolution), and/or other terrestrial mobile or wireless communications technologies. Yet another example of a type of communication link that may be established with the vehicle 102x is an optical or line-of-sight communication link, such as an infrared or microwave link (not shown). Still another example of a type of communication link that may be established with the vehicle 102x is a wireless local area network (WLAN) or Wi-Fi™ link supported on a Wi-Fi allocated frequency band (e.g., 2.4 and/or 5 GHz), and using a protocol corresponding to an IEEE (Institute of Electrical and Electronics Engineers) 802.11 standard, as denoted in FIG. 1 by reference 108c for a Wi-Fi forward link, reference 110c for a Wi-Fi reverse link, and one or more structures 112c supporting the Wi-Fi links 108c, 110c. It is clear, however, that any suitable wireless communication link that includes a forward link 108n and/or a reverse link 110n and that is supported by one or more corresponding structures 112n may allow for communications between the data center 105 or the hybrid communications distributor 104 and a vehicle 102x.

In an embodiment, one or more of the transceivers or modems fixedly connected to the vehicle 102x may be operated in a unidirectional mode, while one or more other transceivers or modems fixedly connected to the vehicle 102x may be operated in a bi-directional mode. For example, a transceiver or modem on the vehicle 102x that is tuned to a satellite communications link or spectrum may be utilized in a receive-only mode (and, as such, may be communicatively connected to the forward link 108b but not communicatively connected to the reverse link 110b), while another transceiver or modem on the vehicle 102x that is tuned to an ATG communications spectrum may be utilized in both receive and transmit mode (and, as such, may be communicatively connected to both the forward link 108a and to the reverse link 110a).

In an embodiment, at least one or more of the transceivers or modems fixedly connected to the vehicle 102x may be pre-configured to support a plurality of modulation schemes or techniques. That is, the set of candidate modulation schemes supported by the transceiver/modem may be pre-defined prior to transit of the vehicle 102x. As such, the configuring of the one or more transceivers or modems to support the plurality of candidate modulation schemes may be performed while the vehicle 102x to which the one or more transceivers/modems are fixedly connected is parked or docked at a port and has not yet begun to traverse a route, e.g., while the vehicle 102x is not traveling en route between an origination and a destination.

The plurality of modulation schemes supported by the transceivers or modems may include one or more analog modulation schemes and/or one or more digital modulation schemes. Each analog modulation scheme may utilize at least one defined analog modulation technique (e.g., amplitude, angle, sideband, frequency, phase, constant envelope, etc.). Each digital modulation scheme may utilize at least one defined keying technique (e.g., phase-shift, frequency-shift, amplitude-shift, quadrature amplitude, Gaussian-minimum, etc.) and/or at least one defined coding technique (e.g., trellis, differential, stochastic, pseudo-stochastic, turbo-coding, etc.). Generally, the set of pre-defined or pre-configured modulation schemes for which an on-board transceiver or modem is pre-configured may include any known modulation scheme that is able to be utilized on at least one of the wireless forward links 108a-108n.

Each modulation scheme or technique included in the pre-defined or pre-configured set of modulation schemes may correspond to a respective level of performance over a particular forward link and/or of a transceiver/modem. In an embodiment, the beam or entirety of wireless frequencies supporting the particular forward link is covered by the plurality of pre-defined modulation schemes, so that at least one of the plurality of pre-defined modulation schemes is a candidate modulation scheme for a signal transmitted over a particular frequency of the beam.

The plurality of modulation schemes may be pre-configured or pre-defined at the particular transceiver or modem so that the particular transceiver or modem is not required to go off-line when switching from processing received transmissions using one modulation scheme to processing received transmissions using another modulation scheme. In an embodiment, the particular transceiver or modem may merely require a soft switch to change from one modulation scheme to another. In an embodiment, the particular transceiver or modem may not require any hard or soft switching, reconfiguring, resetting, or partial reconfiguring or resetting at all to change from one modulation scheme to another. In an embodiment, the transceiver/modem is pre-configured to simultaneously listen or receive and process signals using at least two of the plurality of pre-defined modulation schemes while the vehicle 102x is en route. In an embodiment, the transceiver/modem is pre-configured to simultaneously listen or receive and process signals using all of the plurality of pre-defined modulation schemes while the vehicle 102x is en route.

Turning now to the hybrid communications distributor 104 included in the data center 105 of the system 100, the hybrid communications distributor 104 may comprise, in an embodiment, a set of computer executable instructions that are stored on one or more non-transitory, tangible computer-readable storage media (e.g., one or more memories or data storage entities), and that are executable by one or more processors of the data center 105. (The data center 105 generally includes one or more computing devices having processors, and is described in more detail in a later section of the present disclosure.) The hybrid communications distributor 104 may manage data or information delivery, e.g., over the links 108 and 110, to and from a device 118 that is being transported by a vehicle 102x.

The device 118 may be a device that is fixedly connected to the vehicle 102x (e.g., a computing device that is included in a Line Replaceable Unit (LRU) on an aircraft), or the device may be a mobile device such as a smart phone, tablet or laptop that is temporarily being transported by the vehicle, e.g., a mobile computing device belonging to a passenger on-board the vehicle. In an embodiment, the device 118 is a computing device including at least one memory and at least one processor, and optionally, at least one user interface and at least one wireless network interface. As used herein, the terms "target device," "recipient device," and "device" are used interchangeably to refer to a device 118 that is on-board a vehicle or being transported by the vehicle, and to which data that is external to the vehicle is to be electronically delivered.

The data that is to be delivered to the device 118 may include any type of data. For example, the data may include user-consumable content data such as a text message, a web page, a media file, streaming data, and/or a response to a previous request received at a user interface of the device 118. In some cases, the data that is to be delivered to the device 118 includes data that is to be presented at a user interface of the device 118. In some scenarios, the data that is to be delivered to the device 118 may be an application, a configuration, an update, or software that the user of the device 118 has requested to be downloaded.

In an embodiment, the hybrid communications distributor 104 may use one the forward links 108 that are supported by respective one or more allocated frequency bands for delivery of data or information to the device 118, and the hybrid communications distributor 104 may receive feedback data or information from the vehicle 102x over a reverse link 110 supported by a different allocated frequency band. In some embodiments, the particular forward link 108 used to deliver data to the vehicle 102x may be selected by the hybrid communications distributor 104, such as discussed in aforementioned U.S. Patent No. 61/901,644. For example, the hybrid communications distributor 104 may select, from the plurality of links 108, one particular forward link that is supported by a particular frequency band for forward data delivery to the device 118, e.g., the satellite communications forward link 108b. The hybrid communications distributor 104 may receive feedback information from the vehicle 102x via a particular reverse link, from the links 110, that is supported by a frequency band other than the particular frequency band over which the forward data was delivered, e.g., the ATG reverse link 110a. In some embodiments, the particular reverse link may be selected from the set of reverse links 110. Accordingly, in this embodiment, a forward link and a reverse link of different frequency bands are paired or associated for data delivery purposes to and from the vehicle 102x.

At least because forward link and reverse links are supported by different frequency bands, a different messaging protocol and/or delivery scheme (e.g., broadcast, multicast, unicast) may be used for sending information to the vehicles 102 than is used for receiving feedback information from the vehicles 102. For instance, a broadband protocol may be utilized to deliver data over a selected forward link 108b, and a point-to-point protocol may be utilized to deliver data over a reverse link 108a. Additionally or alternatively, the hybrid communications distributor 104 may cause transmissions to be multicast over a forward link 108b, and may receive feedback information over a reverse link 108a in a unicast format. Such differing frequency bands, messaging protocols, and/or delivery schemes across the forward links 108 and the reverse links 108 and the selection(s) thereof may allow the hybrid communications system 100 to efficiently utilize available spectrum while, at the same time, adhering to existing modem constraints and/or regulatory requirements.

In an embodiment, for a particular forward link 108, the hybrid communications distributor 104 may select one of a plurality of modulation schemes to utilize in delivering forward data to the vehicle 102x. As previously discussed, the set of available modulation schemes may be pre-defined and/or pre-configured, so that the on-board transceiver or modem that is communicatively connected to the particular forward link 108 is not required to be reconfigured or reset in order to change from using one scheme to using another. That is, the set of candidate modulation schemes for forward delivery of data to the vehicle 102x is known a priori to both the hybrid communications distributor 104 and to the transceiver or modem on-board the vehicle 102x.

In an embodiment, each of the candidate modulation schemes corresponds to a different respective level of performance of data delivery over the forward link 108, e.g., data delivery performance. For example, the set of candidate modulation schemes may include a more robust modulation scheme that is suitable for transmissions that are sent when a higher degree of correction is needed to maintain a desired level of data fidelity on the forward link, e.g., when the vehicle 102 is traversing through a precipitous weather system. A more robust modulation scheme typically may require utilization of more resources (e.g., processing time, power, cost, etc.) than a less robust modulation scheme. Accordingly, the set of candidate modulation schemes may also include a less robust modulation scheme that may be utilized for data that is able to tolerate less fidelity, more latency, etc. Indeed, the set of candidate modulation schemes may include multiple schemes, each of which corresponds to a different level of robustness, cost, and/or performance of data delivery. In an embodiment, different forward links 108 supported by different allocated frequency bands each may correspond to a respective set of candidate, pre-defined modulation schemes.

The hybrid communications distributor 104 may select a particular modulation scheme (e.g., one from the set of candidate modulation schemes available for a particular forward link) to use in delivering the data to the vehicle 102x. In an embodiment, the hybrid communications distributor 104 may select a particular modulation scheme based on one or more dynamic conditions, such as a geo-spatial location of the vehicle 102x, a current or anticipated quality of data delivery of the forward link, a transmission requirement or constraint required by the type of data included in the content, and/or another dynamic condition. For example, the hybrid communications distributor 104 may select a particular modulation scheme to achieve a lowest cost (e.g., cost per bit transmission over the forward link) for a given level of fidelity. Additionally or alternatively, the selection may be based on a geo-spatial location and/or orientation of the vehicle 102x (e.g., a current latitude, longitude, altitude, direction, and/or attitude of the vehicle 102x). For instance, the hybrid communications distributor 104 may select one modulation scheme based on the distance of the vehicle 102x between two satellites and an orientation of a satellite antenna on the vehicle 102x with respect to the two satellites.

Still additionally or alternatively, the hybrid communications distributor 104 may select a modulation scheme based on other dynamic conditions, such as a current quality of data transmission over the forward link, and/or a desired or required fidelity, latency, size, or speed for the type of data included in the content that is to be transmitted over the forward link. For example, streaming video content may require a large bandwidth but may have less stringent requirements on real-time delivery (as the streaming data may be buffered), while emergency flight data may have stringent requirements for latency as well as fidelity. In another example, a vehicle 102x may be predicted to travel a path that places a storm system between the vehicle 102*x* and the satellites, and the hybrid communications distributor 104 may select a more robust modulation scheme to use during this time.

Thus, in view of the above, in general the hybrid communications distributor 104 may utilize any suitable combination of modulation schemes, forward links 108, reverse links 110, messaging protocols, and/or delivery schemes to transmit data to and receive feedback information from the vehicles 102 in a distributed or hybrid manner.

Turning now to the vehicles 102, some or all of the vehicles 102 (e.g., the vehicle 102*x*) may each include a respective on-board node 120 to manage data that is received onto the vehicle 102*x* and that is intended for delivery to a particular on-board device 118. In an embodiment, the on-board node 120 is included in an on-board data distribution system or device such as the data distribution device described in aforementioned co-pending U.S. patent application Ser. No. 13/675,200 entitled "VEHICLE DATA DISTRIBUTION SYSTEM AND METHOD." The on-board node 120 may also manage data that is generated by the on-board devices 118 and that is to be transmitted from the vehicle 102*x*, in an implementation. Further, within the vehicle 102*x* itself, the on-board node 120 may manage communications of said data to and from the on-board devices 118, e.g., by using one or more communication networks that are contained within the vehicle 102*x*. In an embodiment, the on-board node 120 may include one or more computing devices that are communicatively connected to one or more transceivers or modems fixedly connected to the vehicle 102*x*. Each of the one or more transceivers or modems may be pre-configured to receive signals using any modulation scheme included in the set of pre-defined modulation schemes, in an embodiment. Additionally, each of the one or more transceivers or modems may be communicatively connected to one or more wired and/or wireless communication networks contained within the vehicle 102*x*.

In some cases, the on-board node 120 may include a hybrid communications collector 122. In an embodiment, the hybrid communications collector 122 may comprise a set of computer executable instructions that are stored on a non-transitory, tangible computer-readable storage media (e.g., a memory) and are executable by one or more processors of the on-board node 120. The hybrid communications collector 122 may receive, via one or more of the forward links 108 and respective modem(s), communications that are provided by the hybrid communications distributor 104 whose contents are intended for delivery to a particular on-board device 118.

The hybrid communications collector 122 may determine the recipient device 118, and may cause the contents of the received communications to be delivered via one or more on-board networks to the recipient device 118. Additionally, the hybrid communications collector 122 may cause feedback data or information to be transmitted via one or more reverse links 110 and their respective modem(s) for delivery to the hybrid communications distributor 104. The feedback data or information may include, for example, data or information associated with, indicative of, or generated based on a current geo-spatial location of the vehicle 102*x*, one or more communications previously received over one or more of the forward links 108, data or information indicative of a state or condition of any one or more of the forward links 108, and/or data or information indicative of a state or condition of any one or more of the reverse links 110.

Turning now to the vehicle data delivery network 106, in an embodiment, at least a portion of the vehicle data delivery network 106 may be disposed in a terrestrial location, e.g., a packet network router, an optical switch, etc. may be located within a climate-controlled structure on the ground. In an embodiment, at least a portion of the vehicle data delivery network 106 may be disposed in a non-terrestrial location, e.g., a routing node may be disposed on a satellite or aircraft. The vehicle data delivery network 106 may include a public network, a private network, or some combination of one or more public networks and one or more private networks. The vehicle data delivery network 106 may include a communications network, a data network, a packet network, or some combination thereof. The vehicle data delivery network 106 may include a hosted network, or may be a peer-to-peer or other type of ad-hoc network. Indeed, the vehicle data delivery network 106 may use any known networking technology or combination(s) thereof for delivering data. For example, the vehicle data delivery network 106 may use any known networking technology or combination(s) thereof for delivering data between the one or more structures 112 and the data center 105 or the hybrid communications distributor 104 at the data center 105. Generally, the vehicle data delivery network 106 may include a plurality of computing devices that are communicatively connected. One or more portions of the vehicle data delivery network 106 may be included in the ground based system described in the aforementioned co-pending U.S. patent application Ser. No. 13/675,190 entitled "GROUND SYSTEM FOR VEHICLE DATA DISTRIBUTION," in an embodiment.

The data center 105 may be communicatively connected to the vehicle data delivery network 106, and may include one or more computing devices in communicative connection so that they collectively appear, to other networks and/or computing devices, as a single logical entity. In an embodiment, the data center 105 includes the hybrid communications distributor 104. The data center 105 may be located at least partially in a terrestrial environment, e.g., in one or more stationary buildings or structures. For example, one or more portions of the data center 105 may be included in a ground distribution network, such as the ground distribution network described in aforementioned co-pending U.S. patent application Ser. No. 13/675,190. In an embodiment, at least a portion of the data center 105 may be located in a non-terrestrial environment, e.g., on an aircraft, satellite, or space station. It is clear, however, that the data center 105 may be located in any suitable environment, whether stationary, mobile, in a vehicle, terrestrial, or non-terrestrial. In an embodiment, multiple data centers 105 may be included in the hybrid communications system 100 for servicing different types of data, different customers, different geographical areas, or any other desired or suitable differentiations.

The data center 105, and in particular, the hybrid communications distributor 104 included in the data center 105, may be communicatively connected via one or more gateways 130 to one or more other networks 132. Generally, a gateway 130 may include one or more computing devices in communicative connection, and may serve as a boundary between the hybrid communications system 100 and one or more other networks 132. In some embodiments, at least some of the computing devices included in the gateway 130 may also be included in the data center 105. The one or more other networks 132 in communicative connection with the gateway 130 may include, for example, the Internet, a PSTN (Public Switched Telephone Network), and/or some other public network. Additionally or alternatively, the one or more other networks 132 may include one or more private networks. The one or more networks 132 may include any number of wired and/or wireless networks. Although FIG. 1 illustrates the data center 105 being connected to one other network 132 via one gateway 130, the techniques and principles described herein equally apply to hybrid communications systems 100 having and/or being in communicative connection with any desired number of other networks 132 via any number of gateways 130. In some embodiments of the system 100, the gateway 130 may be omitted.

In an embodiment, the other network 132 may provide data, e.g., via the gateway 130 or via a direct connection, data that is to be delivered to a particular device 118 that is on-board a vehicle 102x. In an example, the other network 132 is the PSTN communicatively connected to a terrestrial, cellular network to which the device 118 is homed, and the data to be delivered to the device 118 is a text message or a voice mail forwarded by the home system. In another example, the other network 132 is communicatively connected, via a gateway 130, to one or more computing devices that host a website which a user of the device 118 requests access, and information associated with the website (e.g., the web page, objects, and links thereon) is to be delivered to the device 118 for presentation on a user interface of the device 118 in response to the user request. In yet another example, the other network 132 is communicatively connected to a streaming media provider, and a streamed video file is the data to be delivered to the on-board device 118 for consumption by the device's user at a user interface. Of course, any type of data may be provided to the data center 105 by any other network 132 (via the gateway 130, if necessary) for delivery to an indicated device 118 on-board the vehicle 102x, e.g., text messages, web pages, media content, streaming data, a response to a previous request received at a user interface of the device 118, data that is to be presented at a user interface of the device 118, an application, a configuration, or other software that the user of the device 118 has requested to be downloaded from the other network 132. Additionally, return data or information from the on-board device 118 (e.g., an activation of a user control, a return text message, a request or command, etc.) that is received at the hybrid communications distributor 104 may be delivered (via the gateway 130, if necessary) to the other network 132.

Figure 2:
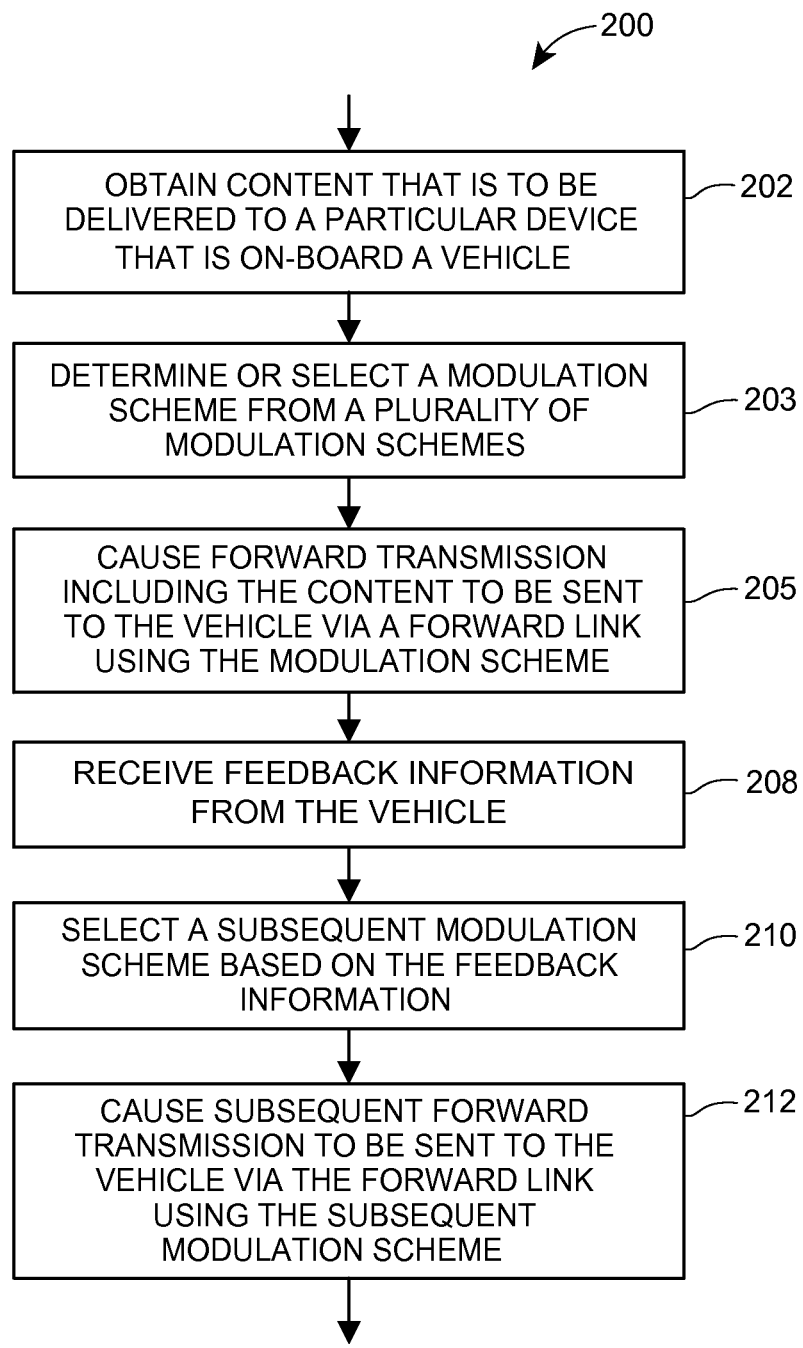
FIG. 2 illustrates an example method of providing hybrid communications to and from devices that are on-board a set of vehicles.

FIG. 2 illustrates an example method 200 for providing communications to and from a device being transported by a vehicle. In an embodiment, the method 200 is performed at least in part by the hybrid communications system 100 of FIG. 1, although some or all of the method 200 may be performed by a communications system other than the system 100. In an embodiment, at least a portion of the method 200 may be performed by the data center 105 or by the hybrid communications distributor 104 of the data center 105. For ease of discussion, the method 200 is described below with simultaneous reference to the system 100 of FIG. 1, however, this is only one of many embodiments and is understood to be non-limiting.

As previously discussed, the recipient device of the data or information included in the communications may be a computing device that is fixedly connected to a vehicle (e.g., a device that is included in an LRU on an aircraft), or the device may be a mobile computing device such as a smart phone, tablet or laptop computing device that is temporarily being transported by the vehicle. In fact, the device may be any device connected to any on-board communication network that is communicatively connected to the on-board node via which data is received onto the vehicle and/or delivered from the vehicle. For ease of discussion, though, and not for limitation purposes, the method 200 is described below in the context of an example scenario in which a device 118 is being transported by a particular vehicle 102x.

At block 202, content that is to be delivered to a particular device 118 being transported by a particular vehicle 102x may be received, e.g., from the network 132, the vehicle data delivery network 106, the data center 105, or from any other suitable source. For example, the data center 105 or the hybrid communications distributor 104 of the data center 105 may receive the content that is to be delivered to the device 118. The received content may include any type of data that may be consumed by a user of the device 118, such as text messages, web pages, media content, streaming data, a response to a previous request received at a user interface of the device 118, and/or data that is to be presented at a user interface of the device 118. In some cases, the received content may be an application, a configuration, other software that the user of the device 118 has requested to be downloaded to the device 118, or other data.

In an embodiment, the content is received in conjunction with an indication that the received content is to be delivered to or specifically delivered to the device 118. For example, the received content may be received in one or more packets, messages or other communicated format including a destination address that particularly and singularly indicates or identifies the particular device 118. In some cases, the specific device 118 is the only device being transported by the set of vehicles 102 that is to receive the content. Upon reception of the content and the indication of the device 118 at a vehicle 102x, the hybrid communications distributor 104 may determine whether or not the target device 118 is currently being transported by (e.g., is on-board) the vehicle 102x.

At block 203, the method 200 may include determining or selecting a modulation scheme from a plurality of predefined modulations schemes to use in transmitting at least a portion of the received content to the vehicle 102x. For example, the hybrid communications distributor 104 may determine or select a modulation scheme from a set of candidate modulation schemes corresponding to a particular forward link 108 over which the forward transmission is to be transmitted. The selection may be based on one or more dynamic conditions, such as a current geo-spatial location of the vehicle 102x on which the target device 118 is being transported, a current quality of data transmission on the particular forward link 108, a current available bandwidth, and/or other current performance characteristics of the forward link 108. Additionally or alternatively, the modulation scheme may be determined or selected based on a type of data included in the content, and/or the modulation scheme may be determined or selected based on any target, required or desired levels (or constraints) of transmission characteristics for the type of data (e.g., target data rate, degree of latency, degree of fidelity, etc.). Still additionally or alternatively, the modulation scheme may be determined or selected based on a target, desired, or required cost of transmission of the data. For example, the target cost of transmission of a first type of data may be a minimum possible cost per bit given the current dynamic conditions, whereas for a second type of data, a higher cost of transmission may be tolerated in view of the fidelity or latency requirements for delivery of the second type of data. Upon determining or selecting the modulation scheme, the hybrid communications distributor 104 may cause the at least a portion of the content to be sent, e.g., via the data delivery network 106, to a particular structure 112 supporting the particular forward link 108 and including a transceiver or modem configured to modulate the content into one or more forward transmissions or transmission units in accordance with the determined or selected modulation scheme.

At block 205, a forward transmission (e.g., a message, packet, or other suitable communication unit) may be caused to be sent, using the selected modulation scheme, over the forward link 108 to the vehicle 102$x$ on which the device 118 is being transported. The forward transmission may include at least a portion of the received content and an indication of the device 118 to which the content is to be delivered. The forward link 108 may be supported by a first allocated frequency band, e.g., the forward link 108$b$ of a satellite communications band.

In an embodiment, the forward transmission may be sent as a multicast transmission, e.g., a transmission that is sent to a plurality of destinations (including the vehicle 102$x$) in an essentially parallel manner. The forward transmission may be multicast, using the determined or selected modulation scheme, to multiple vehicles 102 even though the content included in the multicast forward transmission is to be delivered to only the device 118 and not to other devices on-board the vehicle 102$x$ or on-board other vehicles 102. In an embodiment, the hybrid communications distributor 104 may include the content to be delivered to the device 118 and an indication or identifier of the device 118 in the forward transmission, and the hybrid communications distributor 104 may cause the forward transmission to be multicast, using the determined or selected modulation scheme, over a forward link, e.g., the forward link 108$b$ of the satellite communications band. As such, the multicast transmission may be received by the particular vehicle 102$x$ and by one or more other vehicles 102 that have modems tuned to the frequency band over which the forward transmission is multicast. Each vehicle 102 that receives the multicast transmission may demodulate the received multicast transmission, and may determine, e.g., based on the indication of the device 118 included therein, whether or not the device 118 to which the contents carried in the multicast transmission is to be delivered is currently on-board.

In some cases, multiple forward data that is intended to be respectively delivered to multiple devices on board the vehicle 102$x$ or the vehicles 102 may be multiplexed into a single forward transmission that is modulated using the selected modulation scheme and transmitted over a broadband forward link (e.g., the forward satellite communications link 108$b$). For example, multiple forward data that is to be delivered using a same or common modulation scheme may be multiplexed into one or more forward transmissions that utilize the common modulation scheme on the forward satellite communications link 108$b$. In an embodiment, multiplexed forward transmissions using the common modulation scheme may be multicast to a plurality of vehicles 102 using the common modulation scheme on the forward satellite communications link 108$b$.

In an embodiment, multiple forward data that is to be delivered to multiple devices 108 on-board the plurality of vehicles 102 may be allocated or assigned to different multicast groups based on modulation scheme. Each multicast group may correspond to a different, respective modulation scheme that is utilized to configure multicast forward transmissions to the plurality of vehicles 102. In an embodiment, a multicast forward transmission of the multicast group may include multiplexed data that is to be delivered to different recipient devices 108 on-board the vehicles 102. In some cases, a particular multicast group may correspond to a particular type of forward link, but this correspondence is not required.

In some scenarios, assignment to multicast groups may occur at a broader level. For example, a user may subscribe to a high-bandwidth data delivery service, and any data destined for his or her device may assigned to a multicast group corresponding to the highest-bandwidth modulation scheme. As such, assignment to the multicast group may occur at a device 118 level. In another example, if a company owns a fleet of vehicles and desires to offer an extremely low level of data latency to passenger devices on-board its fleet, each of the fleet of vehicles may be assigned to a multicast group corresponding to an extremely-low latency modulation scheme. Accordingly, assignment to a multicast group may occur at a vehicle level and/or at an institutional level. In another example, all vehicles 102$x$ traversing through a storm system may automatically be allocated to multicast groups corresponding to more robust modulation schemes, and thus, assignment to a multicast group may occur at a geographical level.

At block 208, feedback information may be received. In an embodiment, the feedback information is received at the hybrid communications distributor 104 via a reverse link supported by a different allocated frequency band than the frequency band supporting the forward link over which the forward transmission was sent. For example, if, at block 205, the forward link over which the forward transmission is sent is the forward link 108$b$ of the satellite communications link, the reverse link at the block 208 over which the feedback information is received may be the ATG reverse link 110$a$ or the Wi-Fi reverse link 110$c$. In an embodiment, the feedback information is included in a unicast transmission sent over the reverse link. For instance, the unicast transmission may be transmitted from the vehicle 102$x$ via a selected return link 110.

The feedback information may include, for example, an indication of a geo-spatial location (e.g., a current or predicted altitude, latitude, longitude, attitude, direction, etc.) of the vehicle 102$x$. In an embodiment, data indicative of the current and/or predicted geo-spatial location is included in the feedback information. In an embodiment, an indication of the current and/or predicted geo-spatial location is not included in the feedback information, however, data whose content has been determined based on the current and/or predicted geo-spatial location of the vehicle 102$x$ may be included in the feedback information. For example, the vehicle 102$x$ (e.g., the on-board node 120 and/or the hybrid communications collector 122) may determine its current and/or predictive geo-spatial location, determine one or more suitable modulation schemes to be used for subsequent forward data based on the geo-spatial location, and may include an indication of the one or more suitable modulation schemes in the feedback information. The feedback information may then be delivered to the hybrid communications distributor 104, e.g., via the vehicle data delivery network 106 using the unicast transmission format or another format.

Additionally or alternatively, the feedback information may include information or data corresponding to the received forward transmission (block 202), in an embodiment. For instance, the feedback information may include signaling information corresponding to the forward transmission received at the vehicle 102$x$ over the forward link, e.g., the feedback information may include reverse signaling such as an acknowledgement of a reception of the forward transmission, or an indication that an expected content was not received in the forward transmission. Reverse signaling corresponding to the forward transmissions may be transmitted from the vehicle 102x (or the vehicles 102) over a lower-bandwidth reverse link (e.g., via the reverse ATG link 110a or the reverse Wi-Fi link 110c) rather than over the corresponding higher bandwidth reverse link (e.g., reverse signaling is not transmitted over the reverse satellite communications link 110b in this example). For example, the one or more transceivers or modems on-board the vehicle 102x may operate in a receive-only mode with respect to the satellite communications link 108b. Accordingly, in an embodiment, the forward link of one frequency band may serve as a forward data or payload delivery link, and the reverse link of another frequency band may serve as a signaling link corresponding to the forward data or payload delivery link. Such use of forward and reverse links in different frequency bands may allow efficient use of available communication spectrum while adhering to certain hardware/software constraints or regulatory requirements, in some cases.

In some embodiments, the feedback information may include information corresponding to the current availability, bandwidth, quality of transmission or data delivery, and/or other dynamic characteristic or condition of the forward link 108 over which the forward transmission was received. For example, the on-board data distribution node 120 (or the hybrid communications collector 122 included in the on-board node 120) may determine the quality of the forward link 108 over which the forward transmission was received based on characteristics of the received forward transmission, such as error correction, delay, signal strength, and/or whether the contents were expected or not expected. In some cases, the on-board data distribution node 120 may determine the quality of the forward link (and/or the availability, bandwidth, and/or performance of the forward link, for that matter) via other data, such as the strength of signals received over the forward link, information detected by a link monitor, and the like. In a similar manner, the on-board data distribution node 120 may determine the availability, bandwidth, and/or quality of transmission of other forward links 108 and/or of any or all of the reverse links 110.

At block 210, a modulation scheme to be applied to a subsequent transmission that is to be delivered to the vehicle 102x over the forward link (e.g., a "subsequent modulation scheme") may be selected from the plurality of pre-defined modulation schemes based on the received feedback information. In an embodiment, after the hybrid communications distributor 104 has received the feedback information (block 208), the hybrid communications distributor 104 may select, based on the received feedback information (and in some cases, based on additional information), a subsequent modulation scheme to use for delivery of a subsequent transmission to the vehicle 102x. For example, if the feedback information indicates that a predicted quality of transmission of the forward link is expected to fall below a threshold (e.g., based on the predicted path of the vehicle 102x with respect to the positioning of the satellites), the hybrid communications distributor 104 may select a more robust modulation scheme for the subsequent transmission so that data fidelity may be maintained. Additionally or alternatively, the subsequent modulation scheme may be selected by the hybrid communications distributor 104 based on a type of content that is included in the subsequent forward transmission. For example, a first forward transmission may include a text message that is to be delivered to the device 118, whereas a subsequent forward transmission may include content of a real-time video call that is to be delivered to another device on-board the vehicle 102x. In this example, the hybrid communications distributor 104 may select, for delivery of the video call content, a modulation scheme that has less latency than the modulation scheme used to deliver the text message.

In another example, rather than the hybrid communications distributor 104 determining or selecting the subsequent modulation scheme, the on-board node 120 and/or the hybrid communications collector 122 included in the on-board node 120 may determine one or more suitable or desired subsequent modulation schemes from the plurality of pre-defined modulation schemes, and may merely communicate an indication of the determined modulation scheme(s) in the feedback information. In an embodiment, an indication of a relative priority of the suitable or desired subsequent modulation schemes may also be provided in the feedback information. The on-board node 120 may determine or select the one or more suitable or desired subsequent modulation schemes and/or the content of other feedback information based on a current geo-spatial location of the vehicle 102x, in an embodiment. Additionally or alternatively, the subsequent modulation scheme(s) may be selected based on other dynamic conditions, such as a current quality, an available bandwidth, and/or a current performance measure of the forward link 108. Upon receiving the suggested one or more subsequent modulation schemes from the on-board node 120, the hybrid communications distributor 104 may select or determine the particular subsequent modulation scheme to be used based on the suggestions of the on-board node and/or based on additional criteria, such as a type of data included in the subsequent content to be delivered to the vehicle 102x, customer subscriptions or purchase of higher fidelity data delivery, and the like.

At block 212, the subsequent forward transmission is caused to be sent to the vehicle 102x using the selected modulation scheme via the forward link. For example, the subsequent forward transmission may be caused to be sent to the vehicle 102x in a manner such as previously discussed with respect to the block 205.

Any or all of the method 200 may be executed while the vehicle 102x is any state that indicates a dynamic movement of the vehicle 102x, or that indicates that the vehicle 102x is en route or between an origination and a destination. For example, the vehicle 102x may be an aircraft, and at least a portion of the method 200 may be executed while the vehicle 102x is in any one of a plurality of flight states, e.g., in-flight, climbing, descending, weight-on-wheels, or any one of a plurality of possible port states.

With regard to "port states," generally, as used herein, a "port" may be a designated location from which vehicles may depart and at which vehicles may arrive. Examples of ports may include airports, shipping ports, railroad stations, hospitals, shipping terminals, bus terminals, fueling stations, vehicle maintenance or service areas, military bases, aircraft carriers, and the like. As such, a "port state" of a vehicle, as used herein, generally refers to a vehicle state indicating that the vehicle is in the vicinity of (or proximate to) a vehicle port, e.g., the vehicle is taking-off, landing, taxiing, parked, docked, in the harbor, in the freight yard, etc. A port state may indicate that the vehicle is stationary or is not stationary. A port state may be determined, for example, by determining that the vehicle is within a certain distance of a port, e.g., by using a geo-spatial location of the vehicle (e.g., as determined by a Global Positioning System or GPS), and/or by detecting the presence and/or a signal strength of a beacon signal that is transmitted by a transceiver of the port. Of course, vehicles that are not aircraft may nonetheless have the ability to be in a port state, e.g., when a boat is within a harbor or docked at a port, when a truck is at a gas station or weigh station, or any time when a vehicle is not traveling en route between ports.

In an embodiment, the entirety of the method 200 is executed while the vehicle 102x is in a port state. In an embodiment, the entirety of method 200 is executed while the vehicle 102x is in a dynamic movement state (e.g., in-flight, sailing, or moving along a highway). In an embodiment, the entirety of the method 200 is executed while the vehicle 102x is in stationary state (e.g., parked at a gate, stopped at a rest stop, or halted on a taxi-way).

Figure 3:
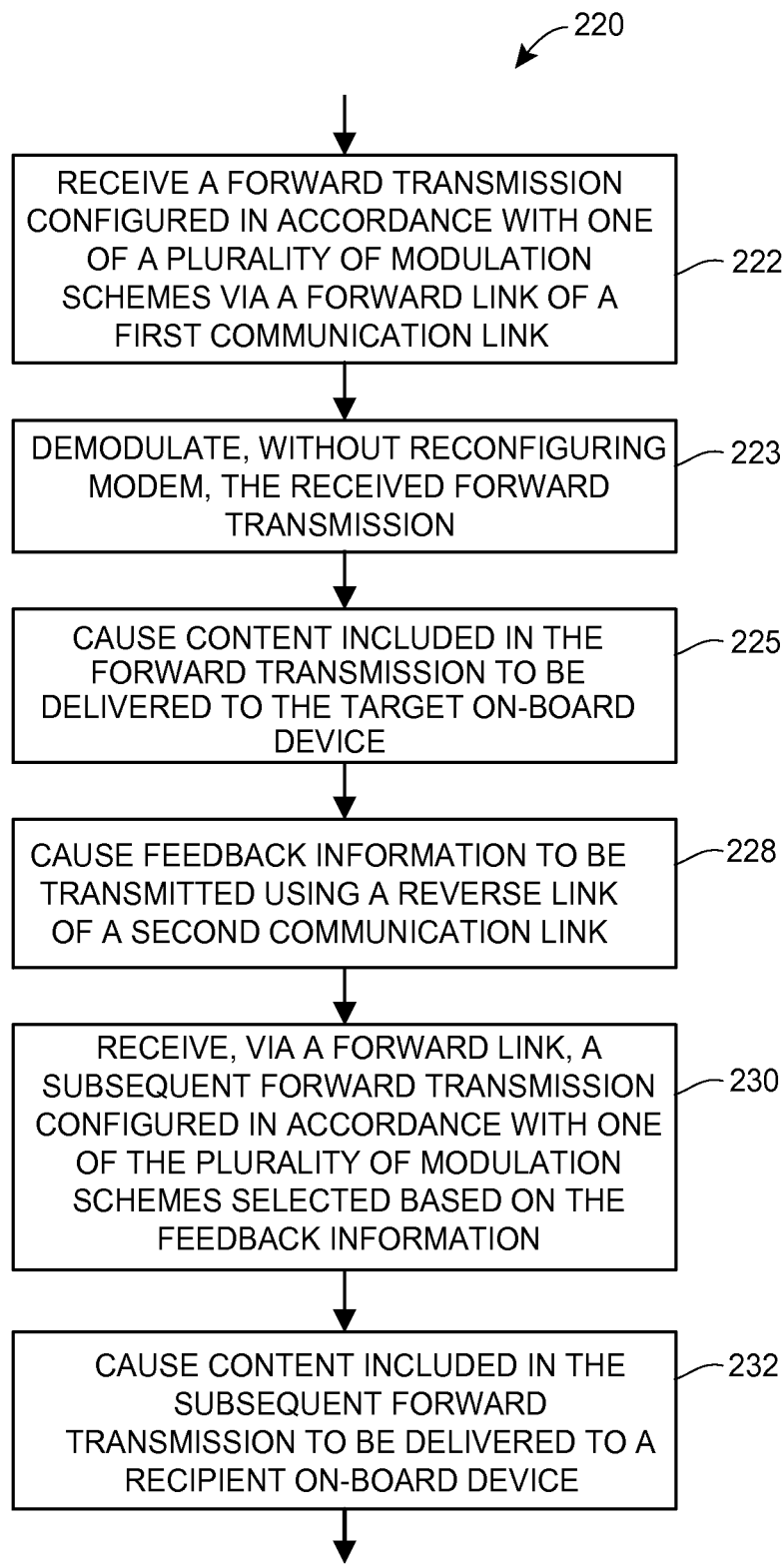
FIG. 3 illustrates an example method of providing hybrid communications to and from devices that are on-board a set of vehicles.

FIG. 3 illustrates an example method 220 for providing communications to and from a device being transported by a vehicle. In an embodiment, the method 220 is performed at least in part by the hybrid communications system 100 of FIG. 1, although some or all of the method 220 may be performed by a communications system other than the system 100. In an embodiment, at least a portion of the method 220 is performed by the hybrid communications collector 122 included in the on-board node 120. In an embodiment, the method 220 may operate in conjunction with a least a part of the method 200 of FIG. 2. For ease of discussion, the method 220 is described below with simultaneous reference to the system 100 of FIG. 1 and the method 200 of FIG. 2, however, this description is only one of many embodiments and is understood to be non-limiting.

As previously discussed, the recipient device of the information or data included in communications received at the vehicle may be any device that is communicatively connected with any on-board communication network that, in turn, is communicatively connected to the on-board node via which the communications are received onto the vehicle. For ease of discussion only and not for limitation purposes, the method 220 is described below in the context of an example scenario in which the device 118 is a mobile computing device being transported by a particular vehicle 102x.

At block 222, a forward transmission including content that is to be delivered to the mobile device 118 on-board the vehicle 102x is received at the vehicle 102x. The forward transmission may be configured in accordance with one of a plurality of modulation schemes (which may be pre-defined or pre-determined), and the forward transmission may be received (block 222) over one of a plurality of forward links 108 to the vehicle 102x at an antenna and a respective transceiver or modem that are fixedly connected to the vehicle 102x. The forward link over which the forward transmission is received may be supported by a first allocated frequency band, e.g., the forward link 108b of the satellite communications band.

The transceiver or modem at which the modulated forward transmission is received may be configured to demodulate, in real-time without requiring reconfiguration, signals received over the forward link that have been modulated using any of the set of pre-defined modulation schemes corresponding to the forward link. Specifically, as the received forward transmission has been modulated using one of the plurality of pre-defined modulation schemes (e.g., at one of the structures 112), the transceiver or modem on-board the vehicle 102x may demodulate the received forward transmission and provide the demodulated forward transmission to the on-board node 120 (or to the hybrid communications collector 122 included in the on-board node) to recover the content and the indication of the content's target device 118 (block 223).

In an embodiment, the forward transmission may be received at the vehicle 102x (block 222) as a multicast transmission that has been modulated using one of the pre-defined modulation schemes. The multicast transmission may include the content to be delivered to the device 118 and an indication or identifier of the target or recipient device 118. In an embodiment, the content and the indication of the target device 118 may be multiplexed, in the multicast transmission, with other content that is intended to be delivered to the target device 118 or to other target devices on-board any of the vehicles 102. At the particular vehicle 102x, after the modem/transceiver has demodulated the received multicast transmission, the transceiver or modem may provide the demodulated, multicast forward transmission to the on-board node 120 (or to the hybrid communications collector 122 included in the on-board node). The on-board node 120 or the hybrid communications collector 122 may recover the content and the indication of the content's target device 118 included therein, in an embodiment. In situations where the received transmission is a multiplexed transmission, the on-board node 120 or the hybrid communications collector 122 may de-multiplex the transmission.

Based on the indication of the target device 118 included in the forward transmission, the hybrid communications collector 122 may determine whether or not the target device 118 to which the content is to be delivered is currently on-board the vehicle 102x. If the device to which the content is to be delivered is determined to be not on-board the vehicle 102x, no further processing on the received forward transmission may be performed. If the device to which the content is to be delivered is determined to be on-board the vehicle 102x, e.g., the device 118, the method 220 may include causing the content of the received transmission to be sent to the recipient or target device 118 via one or more communication networks contained within the vehicle 102x (block 225). For example, if the device 118 is a mobile computing device connected to a Wi-Fi network on-board the vehicle 102x, the hybrid communications collector 122 may include the content in an IEEE 802.11 compatible transmission, and may cause the transmission to be delivered over the on-board Wi-Fi network to the device 118. Other examples of on-board data delivery other than Wi-Fi, though, are additionally or alternatively possible. Indeed, the method 220 may use any means and/or techniques of delivering, within the vehicle 102x, the received content to an on-board device, such as any of the means and/or techniques described in the aforementioned co-pending U.S. patent application Ser. No. 13/675,200.

In an embodiment, the content is to be delivered only to the device 118, and not to any other device on-board the vehicle 102x or to any other device on-board the plurality of vehicles 102. The content may include data that is to be presented at a user interface of the device 118, data that is to be stored at or executed by the device 118, or any other data that is to be utilized by the device 118 or by a user of the device 118, such as previously discussed.

At block 228, feedback information may be caused to be transmitted from the vehicle 102x. In an embodiment, the feedback information may be transmitted from the vehicle 102x using a reverse link 110 that is supported by a different allocated frequency band than the frequency band supporting the forward link over which the forward transmission was received (block 222). For example, if the forward link (block 222) is the forward link 108b of the satellite communications link, the reverse link over which the feedback information is transmitted (block 228) may be the ATG reverse link 110a or the Wi-Fi reverse link 110c. In an embodiment, the particular reverse link is selected, e.g., by the on-board node 120 or the hybrid communications collector 122. In an embodiment, the feedback information is included in a unicast transmission sent over the reverse link 100. For instance, the hybrid communications collector 122 may cause the unicast transmission to be transmitted from the vehicle 102x via the return link 110.

In an embodiment, the on-board node 120 (or the hybrid communications collector 122 included in the on-board node 120) may determine the contents of the feedback information. As previously discussed with respect to FIG. 2, the feedback information may include information or data corresponding to the received forward transmission (block 222) or to other received forward transmissions, information or data corresponding to the forward link 108 over which the forward transmission (block 222) was delivered to the vehicle 102x, information or data corresponding to other forward links, and/or information or data corresponding to one or more reverse links 110. For example, the feedback information may include reverse signaling information corresponding to the forward transmission received at the vehicle 102x over the forward link (block 222), e.g., the feedback information may include an acknowledgement of a reception of the forward transmission, or that an expected content was not received in the forward transmission. As such, in this example, the vehicle 102x may utilize the forward link of one frequency band as a forward data or payload delivery link, and may utilize the reverse link of another frequency band as a signaling link corresponding to the forward data or payload delivery link.

Also as previously discussed, in some embodiments, the contents of the feedback information may include indications of or may be based on a current or predicted characteristic or condition of the vehicle 102x (e.g., a current or predicted geo-spatial location of the vehicle 102x), and/or the contents of the feedback information may include indications of or may be based on a current dynamic characteristic or condition of the forward link (e.g., a current quality of transmission or data delivery, available bandwidth, performance, or other dynamic characteristic or condition of the forward link).

In an embodiment, the vehicle 102x may utilize the forward link (e.g., the forward link of block 222) as a unidirectional communication link. For example, the vehicle 102x may cause the transceiver or the modem that is communicatively connected to a first communications link including the forward link to operate in a receive-only mode. Rather than using the reverse link of the first communication link, though, the vehicle 102x may instead utilize a reverse link of a second communication link (e.g., the reverse link of block 228). The vehicle 102x may utilize the second communication link as a unidirectional link (e.g., by placing the transceiver or modem connected to the second communication link in a transmit-only mode), or the vehicle 102x may utilize the second communication link as a bi-directional link (e.g., by allowing the transceiver or modem connected to the second communication link to be used in both receive and transmit modes).

At block 230, a subsequent forward transmission may be received at the vehicle 102x. The subsequent forward transmission may include additional content that is to be delivered to the device 118, or the subsequent forward transmission may include content that is to be delivered to another device on-board the vehicle 102x or on-board other vehicles 102. The subsequent forward transmission may be received over one of a plurality of forward links to the vehicle 102x, and the modulation scheme of the subsequent forward transmission may have been selected based on the feedback information previously transmitted from the vehicle 102x (block 228), and/or may have been selected based on other criteria, such as a type of the additional content or a customer subscription or purchase of a data plan with a certain performance characteristic. For example, the hybrid communications distributor 104 may have utilized the feedback information of block 228 to select the modulation scheme of the subsequent forward transmission, in an embodiment. Thus, the modulation scheme used for the forward transmission of block 230 may or may not be the same modulation scheme used for the forward transmission of block 222. In an embodiment, similar to the discussion with respect to block 222, the received subsequent forward transmission may be a multiplexed and/or a multicast transmission.

The hybrid communications collector 122 may determine whether or not the device to which the content of the subsequent forward transmission is to be delivered is currently on-board the vehicle 102x, e.g., in a similar manner as discussed above with respect to block 225. If the device to which the content is to be delivered is determined to be not on-board the vehicle 102x, no further processing on the subsequent transmission may be performed. If the device to which the content is to be delivered is on-board the vehicle 102x, e.g., the device 118, the method 220 may include causing the content of the received subsequent transmission to be sent to the recipient or target device 118 via one or more communication networks contained within the vehicle 102x (block 232), e.g., in a manner similar to that discussed above with respect to the block 225.

In an embodiment, after the block 232, the method 220 may include causing subsequent feedback information to be sent from the vehicle 102x (not shown). The subsequent feedback information may include data or information similar to the data or information previously discussed with respect to block 228. The hybrid communications distributor 104 may then utilize the subsequent feedback information to select a next modulation scheme, in an embodiment.

Similar to the method 200, any or all portions of the method 220 may be executed while the vehicle 102x is any state that indicates a dynamic movement of the vehicle 102x, such as a flight state or a state indicating that the vehicle 102x is traveling between ports. Any or all of the method 220 may be executed while the vehicle 102x is in any port state. Any or all of the method 220 may be executed while the vehicle 102x is in stationary state (e.g., parked at the gate, docked at a port, or halted on a taxi-way).

Figure 4:
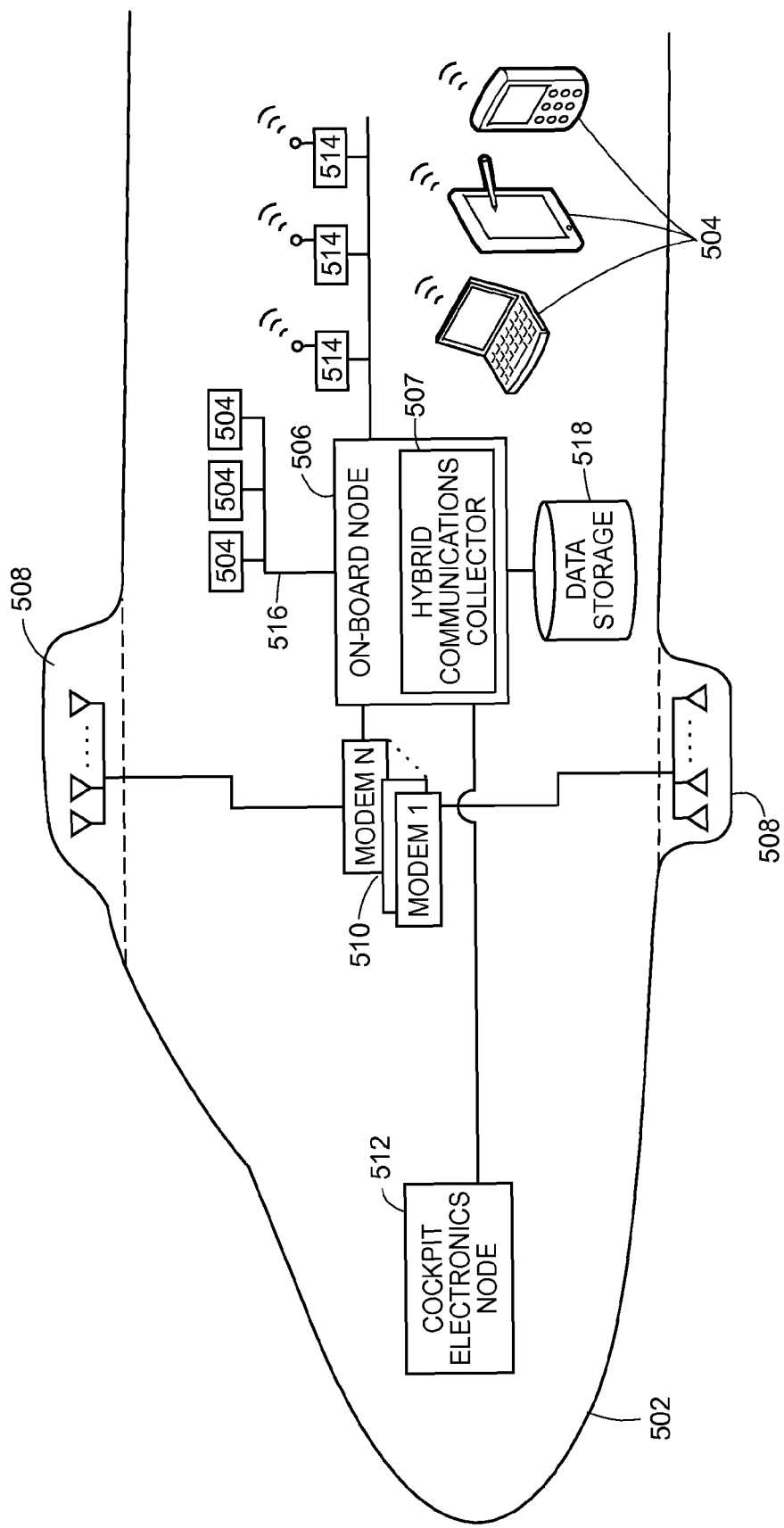
FIG. 4 is a block diagram of an example system contained within a vehicle that is configured to receive hybrid communications or data onto the vehicle and deliver the received information or data to a recipient device that is on-board the vehicle.

FIG. 4 illustrates an example on-board system 500 in a vehicle 502 that may receive information or data onto the vehicle 502 (e.g., information or data provided by the data center 105, the hybrid communications distributor 104, or other suitable information distributor) in a transmission that has been modulated using a modulation scheme included in a set of pre-defined modulation schemes. Additionally, the system 500 may cause feedback information to be delivered from the vehicle 502, e.g., to the data center 105 or the hybrid communications distributor 104 to influence further selections of further utilized modulation schemes. Further, the on-board system 500 may cause data to be delivered to and/or received from one or more devices 504 being transported by the vehicle 502. In an embodiment, the vehicle 502 is the vehicle 102x, and the one or more devices 504 is one of the devices 118.

The example on-board system 500 includes one or more antennas 508 that are communicatively connected to one or more modems or transceivers 510. Each of the forward links 108 to the vehicle 502 may be serviced by at least one antenna 508 and at least one modem 510. Each of the reverse links 110 from the vehicle 502 may be serviced by at least one antenna 508 and at least one modem or transceiver 510.

Each of the one or more antennas 508 may receive and transmit signals via a different respective frequency band allocated for wireless communications, e.g., the $K_a$ band, the L band, the $K_u$ band, the WiMAX band, the Wi-Fi band, a terrestrial cellular band, or any other suitable wireless communication frequency band, which may be terrestrial or may be non-terrestrial. Each of the antennas 508 may be communicatively connected to an associated modem or transceiver 510 that is fixedly connected to the vehicle 502 and is configured to modulate, demodulate, encode and decode information and data corresponding to signals at the respective antenna 508, in an implementation. The one or more modems or transceivers 510 may include a respective modem or transceiver that is compatible with TDMA (Time Division Multiple Access), GSM (Global System for Mobile Communications), CDMA (Code Division Multiple Access), LTE (Long Term Evolution) communications, WiMAX, and/or any other terrestrial mobile communications technology. In some embodiments, the one or more modems 510 may include a respective modem or transceiver that is compatible with EVDO (Evolution Data Optimized) or Wi-Fi communications technologies. It is clear, however, that the on-board system 500 may include any number of antennas 508 and any different number of associated modems or transceivers 510 to support any desired number of different wireless communication technologies.

In some embodiments, a particular modem 510 may be used in a bi-directional configuration, and in some embodiments, a particular modem 510 may be configured as a receive-only modem, such as described in aforementioned U.S. Provisional Patent Application 61/901,641.

In an embodiment, a particular modem 510 servicing a particular forward link 108 may be configured a priori (e.g., prior to the vehicle 502 departing from a port to travel to a destination) to support a plurality of pre-defined modulation schemes for that particular forward link 108. That is, while the vehicle 502 is en route, the particular modem 510 is not required to reset or reconfigure in order to support a change in modulation schemes. Rather, the particular modem 510 is configured to dynamically change modulation schemes in real-time without going off-line, even temporarily, and as such, the particular modem 510 may be configured to receive and demodulate, in real-time, forward transmissions that have been modulated by any of the plurality of pre-defined modulation schemes, in an embodiment. Each of the pre-defined modulation schemes may correspond to a respective level of performance of the forward link, in an embodiment, and the plurality of pre-defined modulation schemes may be also known to the data center 105 or the hybrid communications distributor 104 included in the data center 105.

In an embodiment, each forward link 108 may correspond to a respective set of pre-defined modulation schemes, and an indication of this correspondence may be stored at the vehicle 502 and at the data center 105. For example, a set of pre-defined modulation schemes that are available for use on a satellite forward link 108*b* may differ from a set of pre-defined modulation schemes that are available for use on a ground-based or terrestrial cellular communications forward link 108*a*. The respective mappings between particular links and corresponding candidate, pre-defined modulation schemes may be stored at a data storage entity 518 at the vehicle 502 and at a data storage entity accessible to the data center 105. In an embodiment, modifications may be made to the sets of pre-defined modulation schemes, however, typically (but not necessarily) such modifications may be made while the vehicle 502 is stationary and/or is not en route between an origination and a destination.

The example on-board system 500 includes an on-board node 506, such as an Auxiliary Computer Power Unit (ACPU), that may be a computing device communicatively connected to one or more external communication links 108, 110 via the one or more antennas 508 and one or more modems or transceivers 510. In an embodiment, the on-board node 506 may be the on-board node 120, and may include an instance of the hybrid communications collector 122, which is represented in FIG. 4 by the block 507.

In addition, when the vehicle 502 is an aircraft, a cockpit electronics node 512 may be communicatively coupled to the on-board node 506. The cockpit electronics node 510 may be a LRU configured to collect electronic information from various instruments in the cockpit of the aircraft, e.g., during flight. In some cases, the cockpit electronics node 510 may provide collected flight information such as altitude, airspeed, aircraft position, aircraft direction, or other flight state information to the hybrid communications collector 507, the on-board node 506, or directly to the vehicle data distribution network 106, e.g., via a designated return link.

At least some of the devices 504 may be mobile computing devices such as smartphones, tablet computers, laptop computers, personal digital assistants, e-readers, etc. that are capable of establishing a wireless communicative connection with the hybrid communications collector 507 via one or more wireless access points 514, e.g., via a wireless network interface. Some of the devices 504 may be wired computing devices that are communicatively connected to the on-board node 506 via a wired network 516.

In some implementations, one or more of the devices 504 may be an on-board data storage entity 518 that may store various types of data which may be distributed to and/or received from other devices 504, e.g., entertainment content, web pages, account information, usage data, applications that may be installed, information identifying the devices 504, payment information (e.g., encrypted financial account information), digital rights management (DRM) keys, and/or any other data that is desired to be stored, at least temporarily, on-board the vehicle 502. In an embodiment, the data storage entity 518 may store a mapping of pre-defined modulation schemes that may be utilized on a particular forward link 108.

Figure 5:
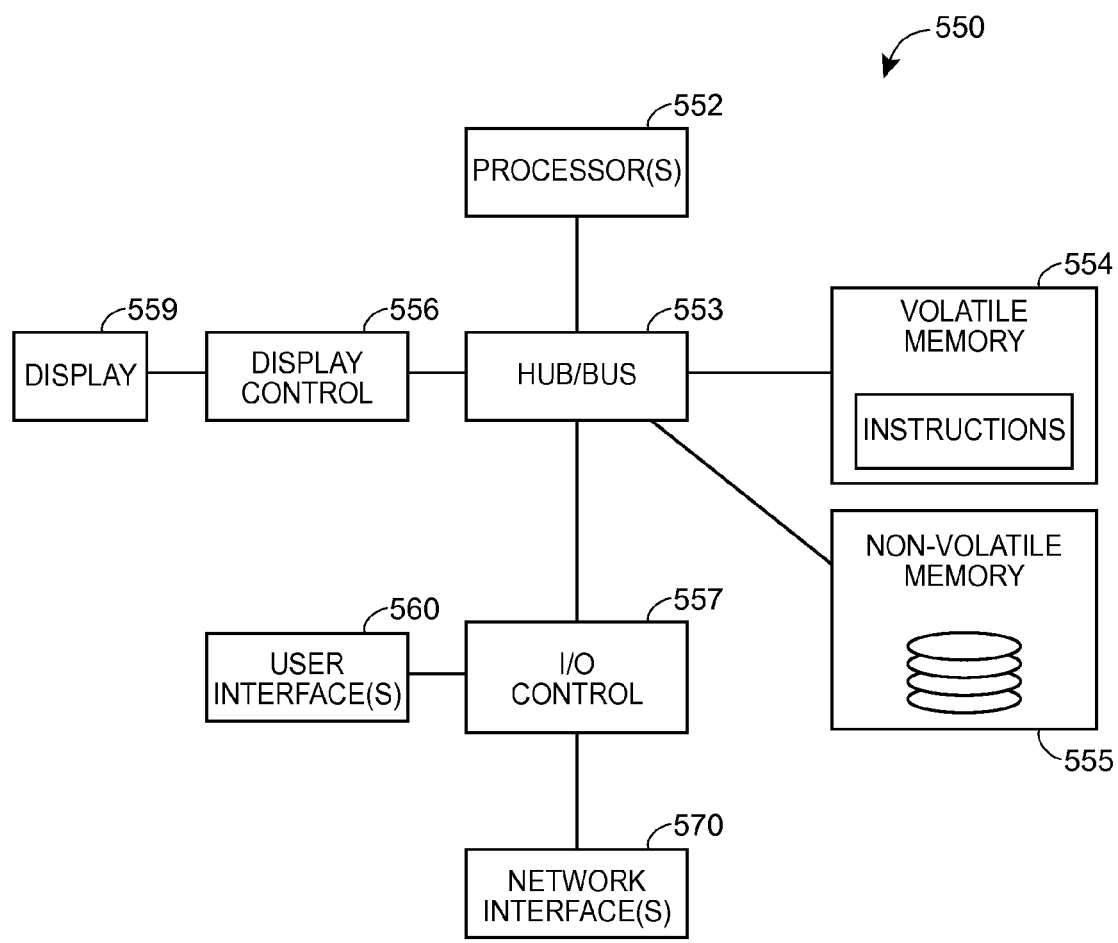
FIG. 5 is a block diagram of an example computing device that may be utilized in a hybrid communications system.

FIG. 5 illustrates a block diagram of an example computing device 550 that may be utilized in the hybrid communications system 100. For example, one or more computing devices 550 may be particularly configured to be utilized as at least a portion of the data center 105, the vehicle data delivery network 106, the on-board node 120, or the device 118. Additionally, other devices illustrated in FIGS. 1 and 4 such as the cockpit electronics node 512 may include an embodiment of the computing device 550.

The computing device 550 may include, for example, one or more central processing units (CPUs) or processors 552, and one or more busses or hubs 553 that connect the processor(s) 552 to other elements of the computing device 550, such as a volatile memory 554, a non-volatile memory 555, a display controller 556, and an I/O controller 557. The volatile memory 554 and the non-volatile memory 555 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 554 and/or the memory 555 may store instructions 558 that are executable by the processor 552. For example, in a computing device particularly configured to be included in the data center 105, the instructions 558 may be the instructions comprising the hybrid communications distributor 104. In another example, in a computing device 550 particularly configured to be the on-board node 120, the instructions 558 may be the instructions comprising the hybrid communications collector 122. Indeed, each of the modules, applications and engines described herein can correspond to a different set of machine readable instructions for performing one or more functions described above. These modules need not be implemented as separate software programs, procedures or modules, and thus various subsets of these modules can be combined or otherwise re-arranged in various embodiments. In some embodiments, at least one of the memories 554, 555 stores a subset of the modules and data structures identified herein. In other embodiments, at least one of the memories 554, 555 stores additional modules and data structures not described herein.

In an embodiment, the display controller 556 may communicate with the processor(s) 552 to cause information to be presented on a connected display device 559. In an embodiment, the I/O controller 557 may communicate with the processor(s) 552 to transfer information and commands to/from the user interface 560, which may include a mouse, a keyboard or key pad, a touch pad, click wheel, lights, a speaker, a microphone, etc. In an embodiment, at least portions of the display device 559 and of the user interface 560 are combined in a single, integral device, e.g., a touch screen. Additionally, data or information may be transferred to and from the computing device 550 via a network interface 570. In some embodiments, the computing device 550 may include more than one network interface 570, such as a wireless interface and a wired interface.

The illustrated computing device 550 is only one example of a computing device suitable to be particularly configured for use in the hybrid communications system 100. Other embodiments of the computing device 550 may also be for use in the hybrid communications system 100, even if the other embodiments have more or fewer components than shown in FIG. 5, have one or more combined components, or have a different configuration or arrangement of the components. Moreover, the various components shown in FIG. 5 can be implemented in hardware, a processor executing software instructions, or a combination of both hardware and a processor executing software instructions, including one or more signal processing and/or application specific integrated circuits.

Therefore, in view of the techniques, systems, methods and concepts described herein, a hybrid communications system 100 may be configured to provide adaptive modulation for delivery of data to a device 118 that is on-board a vehicle 102x, and in particular, while the vehicle 102x is in transit. In contrast to adaptive modulation performed by systems in which the forward and reverse links to a destination are supported by the same wireless frequency band and/or protocol, the hybrid communications system 100 may adaptively change modulations schemes for data delivery to the vehicle 102x even though the forward link to the vehicle 102x and the reverse link from the vehicle 102x are supported by different frequency bands and/or protocols.

Accordingly, the hybrid communications system 100 allows data to be dynamically delivered to the vehicle 102x according to target constraints, even in light of vehicle movement/orientation, and dynamic environmental and link conditions.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A method of providing communications to and from devices being transported by vehicles, comprising obtaining, at a hybrid communications distributor disposed in a terrestrial location, first content that is to be delivered to a device, where the device is a mobile computing device that is temporarily being transported by a vehicle; selecting, by a processor of the hybrid communications distributor, a first modulation scheme from a set of pre-defined modulation schemes; and causing, by the hybrid communications distributor, a forward transmission to be sent via a forward link to the vehicle, where the forward link included in a first communication link supported by a first frequency band, the forward transmission is configured using the first modulation scheme, and the forward transmission includes (i) the first content, and (ii) an indication of the device. The method may comprise receiving feedback information from the vehicle at the hybrid communications distributor via a reverse link included in a second communication link supported by a second frequency band; selecting, by the processor of the hybrid communications distributor and based on the feedback information, a second modulation scheme from the set of pre-defined modulation schemes for delivery of a subsequent forward transmission to the vehicle, the subsequent forward transmission including second content to be delivered to the device or to another device being transported by the vehicle; and causing, by the hybrid communications distributor, the subsequent forward transmission to be sent via the forward link to the vehicle, where the subsequent forward transmission is configured using the second modulation scheme.

2. The method of the preceding aspect, wherein the vehicle is a particular vehicle, the device to which the first content is to be delivered is a particular device, and the particular device is an only device to which the first content is to be delivered; and wherein causing the forward transmission configured using the first modulation scheme to be sent to the particular vehicle comprises causing the forward transmission configured using the first modulation scheme to be multicast to a plurality of vehicles, the plurality of vehicles including the particular vehicle, the plurality of vehicles transporting a plurality of devices, and the plurality of devices including the particular device.

3. The method of any one of the preceding aspects, wherein receiving the feedback information via the reverse link comprises receiving a unicast transmission including the feedback information.

4. The method of any one of the preceding aspects, wherein at least one of: (i) selecting the first modulation scheme comprises selecting the first modulation scheme based on at least one of: a current geo-spatial location of the vehicle, a current quality of the forward link, a current available bandwidth of the forward link, a type of data included in the first content, or one or more target levels of one or more transmission characteristics from a set of transmission characteristics including a data rate, a latency level, a fidelity level of received data, or a cost of transmission; or (ii) selecting the second modulation scheme based on the feedback information comprises selecting the selected modulation scheme based on at least one of: an updated geo-spatial location of the vehicle, an updated quality of the forward link, an updated available bandwidth of the forward link, a type of data included in the second content, or the one or more target levels of the one or more transmission characteristics.

5. The method of any one of the preceding aspects, wherein selecting the first modulation scheme based on the current geo-spatial location of the vehicle comprises selecting the first modulation scheme based on at least one of a current altitude, a current latitude, a current longitude, a current attitude, or a current direction of the vehicle.

6. The method of any one of the preceding aspects, wherein causing the forward transmission to be sent to the vehicle comprises causing the forward transmission to be sent to the vehicle while the vehicle is in-flight.

7. The method of any one of the preceding aspects, wherein at least one of: (i) causing the forward transmission to be sent to the vehicle using the forward link included in the first communication link supported by the first frequency band comprises causing the forward transmission to be sent to the vehicle using a forward link of at least one of: an L band communication link, a Ku band communication link, a Ka communication link, or a communication link configured to communicate information with one or more satellites; or (ii) receiving the feedback information via the reverse link included in the second communication link supported by the second frequency band comprises receiving the feedback information via a reverse link of at least one of: an air-to-ground (ATG) communication link that is configured to deliver data to and from the vehicle while the vehicle is in-flight, a terrestrial cellular communication band link, a Wi-Fi link, a Wi-Max link, or another link configured to support terrestrial wireless communications.

8. The method of any one of the preceding aspects, wherein selecting the first modulation scheme from the set of pre-defined modulation schemes comprises selecting the first modulation scheme from a set of pre-defined modulation schemes, and wherein each modulation scheme included in the set of pre-defined modulation schemes corresponds to a respective level of performance of the forward link.

9. A hybrid communication system for communicating with devices that are being transported by vehicles, the hybrid communication system configured to perform none or any one of the preceding aspects, and the hybrid communication system comprising: a hybrid communications distributor communicatively connected to an in-flight vehicle via a forward link included in a first wireless communication link, wherein the forward link supports a plurality of modulation schemes, and each modulation scheme included in the plurality of modulation schemes corresponding to a respective level of performance. The hybrid communications distributor includes: one or more processors and one or more non-transitory, tangible, computer-readable storage media storing computer-executable instructions that, when executed by the one or more processors, cause the hybrid communications distributor to: obtain first content that is to be delivered to a device being transported by the in-flight vehicle; determine one of the plurality of modulation schemes to be utilized for delivery of the first content; cause a forward transmission to be sent to the in-flight vehicle over the forward link using the determined one of the plurality of modulation schemes, the forward transmission including (i) the first content, and (ii) an indication of the device; receive feedback information transmitted from the in-flight vehicle via a reverse link included in a second wireless communication link supported a frequency band different than the frequency band supporting the first wireless communication link; determine, based on the feedback information, a subsequent one of the plurality of modulation schemes for delivery of a subsequent forward transmission to the in-flight vehicle, the subsequent forward transmission including second content to be delivered to the device or to another device being transported by the in-flight vehicle; and cause the subsequent forward transmission to be sent over the forward link to the in-flight vehicle using the selected subsequent one of the plurality of modulation schemes.

10. The hybrid communication system of any one of the preceding aspects, wherein: the forward transmission is multicast to a plurality of vehicles in which the in-flight vehicle is included; the device is included in a plurality of devices being transported by the plurality of vehicles; and the device is an only device of the plurality of devices to which the first content is to be delivered.

11. The hybrid communication system of any one of the preceding aspects, wherein the feedback information includes data corresponding to at least one of: an updated geo-spatial location of the vehicle, an updated quality of the forward link, or an updated available bandwidth of the forward link.

12. The hybrid communication system of any one of the preceding aspects, wherein the determination of the subsequent one of the plurality of modulation schemes is further based on at least one of: a type of data included in the second content; or one or more target levels of one or more transmission characteristics from a set of transmission characteristics including a data rate, a latency level, a fidelity level of received data, or a cost of transmission.

13. The hybrid communication system of any one of the preceding aspects, wherein the first communication link includes at least one of: an L band communication link; a Ku band communication link; a Ka band communication link; or a wireless communication link configured for communications with a satellite.

14. The hybrid communication system of any one of the preceding aspects, wherein: (a) one of: (i) the first communication link is a unidirectional communication link used by the in-flight vehicle, or (ii) the first communication link includes a reverse link that is not used by the in-flight vehicle; and (b) the second communication link is a bi-directional communication link supported by one of: an air-to-ground frequency band allocated for direct communications between in-flight vehicles and ground stations; a terrestrial cellular communications band, a Wi-Fi communications band, or a Wi-Max communications band, or another frequency band allocated for terrestrial wireless communications.

15. A method of providing communications to and from devices being transported by in-flight vehicles, the method including none or any one of the above aspects, and the method comprising: receiving, at a vehicle that is in-flight via a forward link included in a first wireless communication link supported by a first frequency band, a forward transmission in a first modulation scheme included in a plurality of pre-defined modulation schemes that a modem that is fixedly connected to the vehicle is capable of supporting without any reconfiguration; demodulating the forward transmission; determining, by a hybrid communications collector fixedly connected to the vehicle, first content included in the demodulated forward transmission and intended to be delivered to a device, the device being a mobile computing device that is temporarily being transported by the vehicle; causing, by the hybrid communications collector, the first content to be sent to the device using a wireless network contained within the vehicle; causing, by the hybrid communications collector, feedback information to be transmitted from the vehicle using a reverse link included in a second wireless communication link supported by a second frequency band, wherein the feedback information is based on a current geo-spatial position of the vehicle; receiving, at the vehicle, a subsequent forward transmission in a second modulation scheme included in the plurality of pre-defined modulation schemes, the second modulation scheme selected based on the feedback information; demodulating the subsequent forward transmission; and causing, by the hybrid communications collector, the second content to be sent to the device or to the another device using the wireless network contained within the vehicle.

16. The method of any one of the preceding aspects, wherein: the feedback information is first feedback information; the method further comprises causing second feedback information indicative of at least one of a quality of transmission of the forward link or an available bandwidth of the forward link to be transmitted from the vehicle using the reverse link included in the second wireless communication link; and the second modulation scheme is selected further based on the second feedback information.

17. The method of any one of the preceding aspects, wherein the vehicle is included in a plurality of in-flight vehicles, the device is included in a plurality of devices being transported by the plurality of in-flight vehicles, and the device is an only device of the plurality of devices to which the first content is to be delivered; and wherein receiving, at the vehicle, the forward transmission including first content comprises receiving, at the vehicle, a forward transmission that includes the first content and that is a multicast transmission to the plurality of in-flight vehicles.

18. The method of any one of the preceding aspects, wherein: receiving the forward transmission comprises receiving the forward transmission using a first wireless protocol; and causing the feedback information to be transmitted from the vehicle comprises causing the feedback information to be transmitted from the vehicle using a second wireless protocol.

19. The method of any one of the preceding aspects, wherein at least one of the first modulation scheme or the second modulation scheme is selected based on at least one of: a data type of the respective content; or one or more target transmission characteristics from a set of transmission characteristics including a data rate, a level of latency, a fidelity of received data, or a cost of transmission.

20. The method of any one of the preceding aspects, wherein receiving the forward transmission of the first modulation scheme included in the plurality of pre-defined modulation schemes comprises receiving the forward transmission of the first modulation scheme selected from a plurality of pre-defined modulation schemes wherein each modulation scheme included in the plurality of pre-defined modulation schemes corresponds to a respective level of performance of the forward link.

Thus, many modifications and variations may be made in the techniques, methods, and structures described and illustrated herein without departing from the spirit and scope of the present claims. Accordingly, it should be understood that the methods and apparatus described herein are illustrative only and are not limiting upon the scope of the claims.

What is claimed is:

1. A method of providing communications to and from devices being transported by vehicles, comprising:
   obtaining, at a hybrid communications distributor disposed in a terrestrial location, first content that is to be delivered to a device, the device being a mobile computing device that is temporarily being transported by a vehicle that is in-flight and outside of a distance from a vehicle port at which a beacon signal transmitted by a transceiver disposed at the vehicle port is detectable;
   selecting, by a processor of the hybrid communications distributor, a first modulation scheme from a set of pre-defined modulation schemes;
   causing, by the hybrid communications distributor, a forward transmission to be sent via a forward link to the vehicle that is in-flight, the forward link included in a first communication link supported by a first frequency band, the forward transmission configured using the first modulation scheme, and the forward transmission including (i) the first content, and (ii) an indication of the device;
   receiving, at the hybrid communications distributor from the vehicle, via a reverse link included in a second communication link supported by a second frequency band, feedback information including information corresponding to a geo-spatial location of the vehicle that is in-flight, the geo-spatial location including an altitude of the vehicle that is in-flight;
   selecting, by the processor of the hybrid communications distributor and based on the feedback information, a second modulation scheme from the set of pre-defined modulation schemes for delivery of a subsequent forward transmission to the vehicle, the subsequent forward transmission including second content to be delivered to the device or to another device being transported by the vehicle; and
   causing, by the hybrid communications distributor, the subsequent forward transmission to be sent via the forward link to the vehicle, the subsequent forward transmission configured using the second modulation scheme.

2. The method of claim 1, wherein:
   the vehicle is a particular vehicle and the device to which the first content is to be delivered is a particular device;
   causing the forward transmission configured using the first modulation scheme to be sent to the particular vehicle comprises causing the forward transmission configured using the first modulation scheme to be multicast to a plurality of vehicles, the plurality of vehicles including the particular vehicle, the plurality of vehicles transporting a plurality of devices, and the plurality of devices including the particular device; and the particular device is an only device to which the first content is to be delivered.

3. The method of claim 1, wherein receiving the feedback information via the reverse link comprises receiving a unicast transmission including the feedback information.

4. The method of claim 1, wherein the information corresponding to the geo-spatial location of the vehicle that is in-flight based upon which the second modulation scheme is selected is information corresponding to an updated geo-spatial location of the vehicle in-flight, and wherein at least one of:
(i) selecting the first modulation scheme comprises selecting the first modulation scheme based on at least one of:
a current geo-spatial location of the vehicle,
a current quality of the forward link,
a current available bandwidth of the forward link,
a type of data included in the first content, or
one or more target levels of one or more transmission characteristics from a set of transmission characteristics including a data rate, a latency level, a fidelity level of received data, or a cost of transmission; or
(ii) selecting the second modulation scheme based on the feedback information comprises selecting the second modulation scheme based on the information corresponding to the updated geo-spatial location of the vehicle and at least one of:
an updated quality of the forward link,
an updated available bandwidth of the forward link,
a type of data included in the second content, or
the one or more target levels of the one or more transmission characteristics.

5. The method of claim 4, wherein selecting the first modulation scheme based on the current geo-spatial location of the vehicle comprises selecting the first modulation scheme based on at least one of a current altitude, a current latitude, a current longitude, a current attitude, or a current direction of the vehicle.

6. The method of claim 1, wherein at least one of:
causing the forward transmission to be sent to the vehicle using the forward link included in the first communication link supported by the first frequency band comprises causing the forward transmission to be sent to the vehicle using a forward link of at least one of: an L band communication link, a $K_u$ band communication link, a $K_a$ communication link, or a communication link configured to communicate information with one or more satellites; or
receiving the feedback information via the reverse link included in the second communication link supported by the second frequency band comprises receiving the feedback information via a reverse link of at least one of: an air-to-ground (ATG) communication link that is configured to deliver data to and from the vehicle while the vehicle is in-flight, a terrestrial cellular communication band link, a Wi-Fi link, a Wi-Max link, or another link configured to support terrestrial wireless communications.

7. The method of claim 1, wherein selecting the first modulation scheme from the set of pre-defined modulation schemes comprises selecting the first modulation scheme from a set of pre-defined modulation schemes, and wherein each modulation scheme included in the set of pre-defined modulation schemes corresponds to a respective level of performance of the forward link.

8. The method of claim 1, wherein the geo-spatial location including the altitude of the vehicle that is in-flight comprises a predicted geo-spatial location including a predicted altitude of the vehicle that is in-flight.

9. A hybrid communication system for communicating with devices that are being transported by vehicles, comprising:
a hybrid communications distributor communicatively connected to an in-flight vehicle via a forward link included in a first wireless communication link, the forward link supporting a plurality of modulation schemes, each modulation scheme included in the plurality of modulation schemes corresponding to a respective level of performance, the in-flight vehicle located outside of a distance from a vehicle port at which a beacon signal transmitted by a transceiver disposed at the vehicle port is detectable, and the hybrid communications distributor including:
one or more processors; and
one or more non-transitory, tangible, computer-readable storage media storing computer-executable instructions that, when executed by the one or more processors, cause the hybrid communications distributor to:
obtain first content that is to be delivered to a device being transported by the in-flight vehicle;
determine one of the plurality of modulation schemes to be utilized for delivery of the first content;
cause a forward transmission to be sent to the in-flight vehicle over the forward link using the determined one of the plurality of modulation schemes, the forward transmission including (i) the first content, and (ii) an indication of the device;
receive feedback information transmitted from the in-flight vehicle via a reverse link included in a second wireless communication link supported a frequency band different than the frequency band supporting the first wireless communication link, the feedback information including data corresponding to a geo-spatial location of the in-flight vehicle, the geo-spatial location of the in-flight vehicle including an altitude of the in-flight vehicle;
determine, based on the feedback information, a subsequent one of the plurality of modulation schemes for delivery of a subsequent forward transmission to the in-flight vehicle, the subsequent forward transmission including second content to be delivered to the device or to another device being transported by the in-flight vehicle; and
cause the subsequent forward transmission to be sent over the forward link to the in-flight vehicle using the selected subsequent one of the plurality of modulation schemes.

10. The hybrid communication system of claim 9, wherein:
the forward transmission is multicast to a plurality of vehicles in which the in-flight vehicle is included;
the device is included in a plurality of devices being transported by the plurality of vehicles; and
the device is an only device of the plurality of devices to which the first content is to be delivered.

11. The hybrid communication system of claim 8, wherein the feedback information further includes data corresponding to at least one of: an updated quality of the forward link or an updated available bandwidth of the forward link.

12. The hybrid communication system of claim 9, wherein the determination of the subsequent one of the plurality of modulation schemes is further based on at least one of:
a type of data included in the second content; or
one or more target levels of one or more transmission characteristics from a set of transmission characteristics including a data rate, a latency level, a fidelity level of received data, or a cost of transmission.

13. The hybrid communication system of claim 9, wherein the first communication link includes at least one of:
an L band communication link;
a $K_u$ band communication link;
a $K_a$ band communication link; or
a wireless communication link configured for communications with a satellite.

14. The hybrid communication system of claim 9, wherein:
one of: (i) the first communication link is a unidirectional communication link used by the in-flight vehicle, or (ii) the first communication link includes a reverse link that is not used by the in-flight vehicle; and
the second communication link is a bi-directional communication link supported by one of: an air-to-ground frequency band allocated for direct communications between in-flight vehicles and ground stations; a terrestrial cellular communications band, a Wi-Fi communications band, or a Wi-Max communications band, or another frequency band allocated for terrestrial wireless communications.

15. A method of providing communications to and from devices being transported by in-flight vehicles, comprising:
receiving, at a vehicle that is in-flight via a forward link included in a first wireless communication link supported by a first frequency band, a forward transmission in a first modulation scheme included in a plurality of pre-defined modulation schemes that a modem that is fixedly connected to the vehicle is capable of supporting without any reconfiguration, the vehicle located outside of a distance from a vehicle port at which a beacon signal transmitted by a transceiver disposed at the vehicle port is detectable;
demodulating the forward transmission;
determining, by a hybrid communications collector fixedly connected to the vehicle, first content included in the demodulated forward transmission and intended to be delivered to a device, the device being a mobile computing device that is temporarily being transported by the vehicle;
causing, by the hybrid communications collector, the first content to be sent to the device using a wireless network contained within the vehicle;
causing, by the hybrid communications collector, feedback information to be transmitted from the vehicle using a reverse link included in a second wireless communication link supported by a second frequency band, wherein the feedback information is based on a current geo-spatial position of the vehicle and the current geo-spatial position of the vehicle includes a current altitude of the vehicle;
receiving, at the vehicle, a subsequent forward transmission in a second modulation scheme included in the plurality of pre-defined modulation schemes, the second modulation scheme selected based on the feedback information;
demodulating the subsequent forward transmission; and
causing, by the hybrid communications collector, the second content to be sent to the device or to the another device using the wireless network contained within the vehicle.

16. The method of claim 15, wherein:
the feedback information is first feedback information;
the method further comprises causing second feedback information indicative of at least one of a quality of transmission of the forward link or an available bandwidth of the forward link to be transmitted from the vehicle using the reverse link included in the second wireless communication link; and
the second modulation scheme is selected further based on the second feedback information.

17. The method of claim 16, wherein receiving the forward transmission of the first modulation scheme included in the plurality of pre-defined modulation schemes comprises receiving the forward transmission of the first modulation scheme selected from a plurality of pre-defined modulation schemes wherein each modulation scheme included in the plurality of pre-defined modulation schemes corresponds to a respective level of performance of the forward link.

18. The method of claim 15, wherein:
the vehicle is included in a plurality of in-flight vehicles;
the device is included in a plurality of devices being transported by the plurality of in-flight vehicles, and the device is an only device of the plurality of devices to which the first content is to be delivered; and
receiving, at the vehicle, the forward transmission including first content comprises receiving, at the vehicle, a forward transmission that includes the first content and that is a multicast transmission to the plurality of in-flight vehicles.

19. The method of claim 15, wherein:
receiving the forward transmission comprises receiving the forward transmission using a first wireless protocol; and
causing the feedback information to be transmitted from the vehicle comprises causing the feedback information to be transmitted from the vehicle using a second wireless protocol.

20. The method of claim 15, wherein at least one of the first modulation scheme or the second modulation scheme is selected based on at least one of:
a data type of the respective content; or
one or more target transmission characteristics from a set of transmission characteristics including a data rate, a level of latency, a fidelity of received data, or a cost of transmission.

* * * * *